US012352607B2

(12) United States Patent
Latham et al.

(10) Patent No.: US 12,352,607 B2
(45) Date of Patent: Jul. 8, 2025

(54) POSITION SENSING METHOD

(71) Applicant: Allegro MicroSystems, LLC, Manchester, NH (US)

(72) Inventors: Alexander Latham, Harvard, MA (US); Rémy Lassalle-Balier, Bures sur Yvette (FR)

(73) Assignee: Allegro MicroSystems, LLC, Manchester, NH (US)

( * ) Notice: Subject to any disclaimer, the term of this patent is extended or adjusted under 35 U.S.C. 154(b) by 455 days.

(21) Appl. No.: 17/809,382

(22) Filed: Jun. 28, 2022

(65) Prior Publication Data

US 2023/0417579 A1 Dec. 28, 2023

(51) Int. Cl.
*G01D 5/20* (2006.01)

(52) U.S. Cl.
CPC ....... *G01D 5/2086* (2013.01); *G01D 2205/40* (2021.05)

(58) Field of Classification Search
CPC .. G01D 5/2053; G01D 5/2086; G01D 5/2452; G01D 2205/40
See application file for complete search history.

(56) References Cited

U.S. PATENT DOCUMENTS

| | | | |
|---|---|---|---|
| 3,647,963 A * | 3/1972 | Bailey | G06K 15/22 178/19.03 |
| 4,820,961 A * | 4/1989 | McMullin | G01D 5/2053 318/587 |
| 4,853,604 A * | 8/1989 | McMullin | G01P 3/42 318/653 |
| 5,841,274 A * | 11/1998 | Masreliez | G01D 5/2053 336/131 |
| 8,453,518 B2 | 6/2013 | Diekmann et al. | |
| 9,983,045 B2 | 5/2018 | O'Neill | |
| 10,330,499 B2 | 6/2019 | Elliott et al. | |

(Continued)

FOREIGN PATENT DOCUMENTS

| | | |
|---|---|---|
| EP | 0289033 A2 | 11/1988 |
| EP | 4394331 | 7/2024 |

(Continued)

OTHER PUBLICATIONS

U.S. Appl. No. 18/354,895, filed Jul. 19, 2023, Richards, et al.

(Continued)

*Primary Examiner* — Eman A Alkafawi
*Assistant Examiner* — Suresh K Rajaputra
(74) *Attorney, Agent, or Firm* — Daly, Crowley, Mofford & Durkee, LLP

(57) ABSTRACT

A system, comprising a target, a first receiving coil array, and a second receiving coil array. The target includes: (i) a first array of conductive features that are arranged in a line or arc and separated from one another by voids, and (ii) a second array of conductive features that are arranged in a line or arc and separated from one another by voids, the conductive features in the first array being staggered with respect to the conductive features in the second array. The first receiving coil array is configured to sense a first magnetic field that is associated with the first array of conductive features. The second receiving coil array is configured to sense a second magnetic field that is associated with the second array of conductive features.

38 Claims, 21 Drawing Sheets

(56) References Cited

U.S. PATENT DOCUMENTS

| | | |
|---|---|---|
| 10,816,366 B2 | 10/2020 | Weiland et al. |
| 10,866,122 B2 | 12/2020 | Weiland et al. |
| 11,079,291 B2 | 8/2021 | Bertin |
| 11,112,275 B2 | 9/2021 | Bertin |
| 11,333,530 B2 | 5/2022 | Foletto |
| 11,346,688 B2 | 5/2022 | Stewart |
| 11,408,755 B2 | 8/2022 | Bertin |
| 11,592,319 B2 | 2/2023 | Ausserlechner |
| 11,662,260 B2 | 5/2023 | Latham et al. |
| 11,692,887 B2 | 7/2023 | Witts et al. |
| 2017/0160102 A1* | 6/2017 | Heumann ............ G01D 5/2013 |
| 2017/0166251 A1 | 6/2017 | Shao et al. |
| 2018/0274947 A1* | 9/2018 | Maniouloux ............ G01P 3/49 |
| 2019/0242725 A1 | 8/2019 | Shaga et al. |
| 2019/0331541 A1* | 10/2019 | Janisch ................ G01D 5/2053 |
| 2021/0190545 A1 | 6/2021 | Utermoehlen et al. |
| 2022/0239462 A1 | 7/2022 | Casu et al. |

FOREIGN PATENT DOCUMENTS

| | | |
|---|---|---|
| WO | WO 2006/079793 | 8/2006 |
| WO | WO 2022/132229 | 6/2022 |

OTHER PUBLICATIONS

U.S. Appl. No. 18/354,903, filed Jul. 19, 2023, Lassalle-Balier, et al.
Search Report and Written Opinion dated Oct. 4, 2024 for PCT Application No. PCT/US2024/034944; 15 pages.
Partial Search Report dated Nov. 29, 2024 for European Application No. 24185072.6, 14 pages.
U.S. Appl. No. 17/466,202, filed Sep. 3, 2021, Latham, et al.
U.S. Appl. No. 17/651,265, filed Feb. 16, 2022, Ostermann, et al.
U.S. Appl. No. 17/659,224, filed Apr. 14, 2022, Casu, et al.
Posic Datasheet "IT3402L Triple Channel Linear Encoder Kit", 2021, 4 pages.
Extended European Search Report dated Oct. 23, 2023 for European Application No. 23177829.1-1001; 13 Pages.
Response to Search Opinion filed on Jul. 3, 2024 for European Application No. 23177829.1, 27 pages.
Extended European Search Report dated Mar. 17, 2025 for European Application No. 24185072.6; 15 pages.
Intention to Grant dated Mar. 27, 2025 for European Application No. 23177829.1; 7 pages.

* cited by examiner

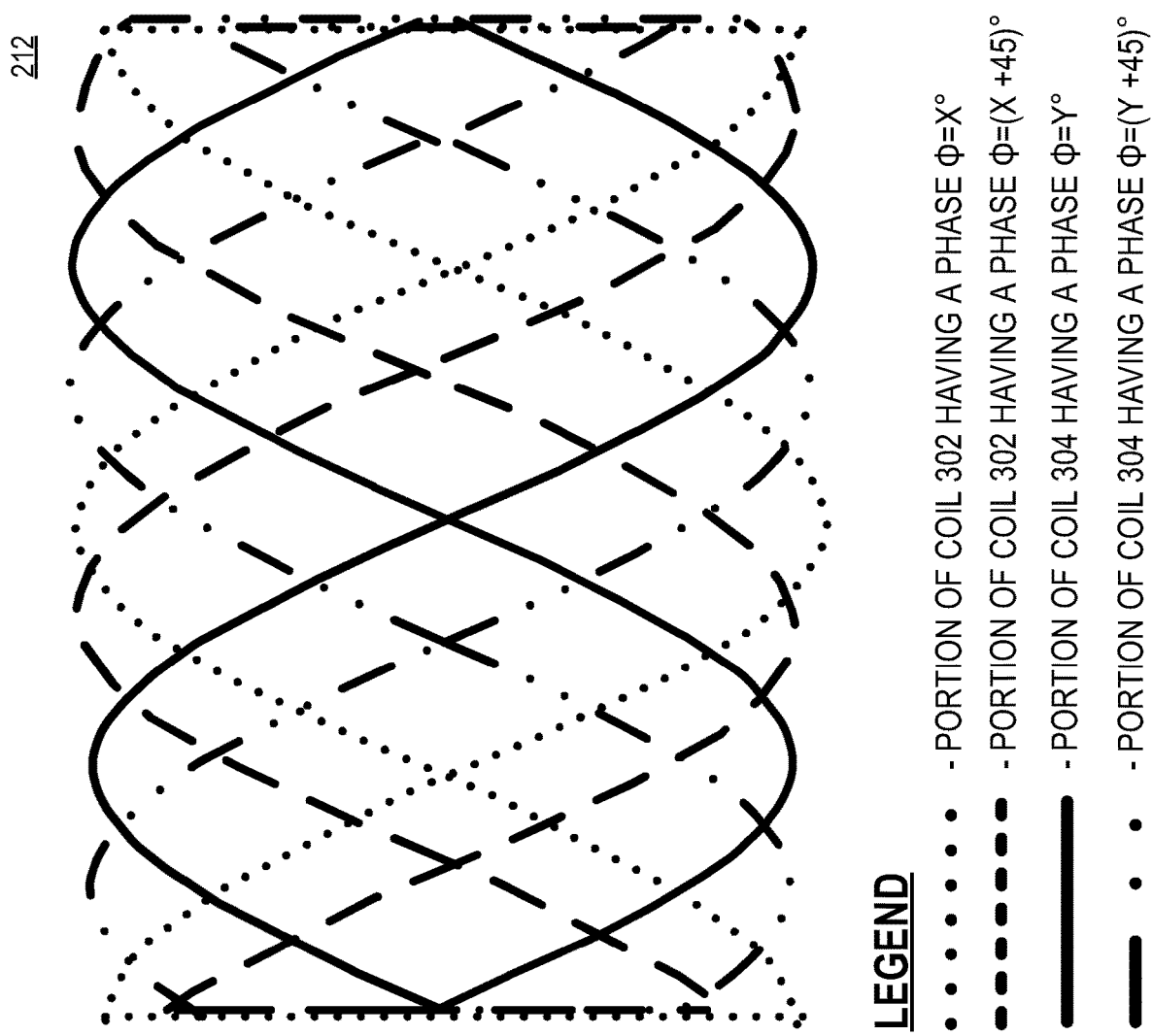

LEGEND

-SIGNAL $So_1$

-SIGNAL $Si_1$

-SELECTOR FUNCTION $SEL_1$

POSITION SENSING METHOD

BACKGROUND

As is known, sensors are used to perform various functions in a variety of applications. Some sensors include one or more electromagnetic flux sensing elements, such as a Hall effect element, a magnetoresistive element, or a receiving coil to sense an electromagnetic flux associated with proximity or motion of a target object. Sensor integrated circuits are widely used in automobile control systems and other safety-critical applications. There are a variety of specifications that set forth requirements related to permissible sensor quality levels, failure rates, and overall functional safety.

SUMMARY

According to aspects of the disclosure, a system is provided, comprising: a target including: (i) a first array of conductive features that are arranged in a line or arc and separated from one another by voids, and (ii) a second array of conductive features that are arranged in a line or arc and separated from one another by voids, the conductive features in the first array being staggered with respect to the conductive features in the second array; a first receiving coil array configured to sense a first magnetic field that is associated with the first array of conductive features; and a second receiving coil array configured to sense a second magnetic field that is associated with the second array of conductive features.

According to aspects of the disclosure, a target is provided, comprising: a first array of conductive features that are separated from one another by voids, the first array including N conductive features, where N is a positive integer greater than 1; and a second array of conductive features that are separated from one another by voids, the second array including N+I conductive features, where I is a positive integer greater than or equal to 1, wherein any of the conductive features in the first array is aligned with at least one of: (i) a respective conductive feature in the second array, and/or (ii) a respective void that separates conductive features in the second array.

According to aspects of the disclosure, a system is provided, comprising: a target including: (i) first array of conductive features that are arranged in a line and separated from one another by voids, the first array including N conductive features, where N is a positive integer greater than 1, and (ii) a second array of conductive features that are arranged in a line and separated from one another by voids, the second array including N+I conductive features, where I is a positive integer greater than or equal to 1; a first receiving coil array configured to sense a first magnetic field that is associated with the first array of conductive features; and a second receiving coil array configured to sense a second magnetic field that is associated with the second array of conductive features.

According to aspects of the disclosure, a system is provided, comprising: a processing circuitry configured to: generate a signal $S_d$ that is indicative of a position of a target that includes a first array of conductive features and a second array of conductive features, the signal $S_d$ being generated based on a signal $S_1$ and a signal $S_2$, the signal $S_1$ being generated in response to a first magnetic field that is associated with the first array of conductive features, and the signal $S_2$ being generated in response to a second magnetic field that is associated with the second array of conductive features; generate a first index signal based on the signal $S_d$ and unwrap the signal $S_1$ based on the first index signal to produce an unwrapped signal $Ua_1$; generate a second index signal based on the signal $S_d$ and unwrap the signal $S_2$ based on the second index signal to produce an unwrapped signal $Ua_2$; and generate an output signal $S_{out}$ based on the unwrapped signals $Ua_1$ and $Ua_2$, the output signal $S_{out}$ being indicative of a position of the target.

BRIEF DESCRIPTION OF THE DRAWINGS

The foregoing features may be more fully understood from the following description of the drawings in which:

FIG. 4C is a diagram of an example of a coil array, according to aspects of the disclosure;

DETAILED DESCRIPTION

Figure 1A:
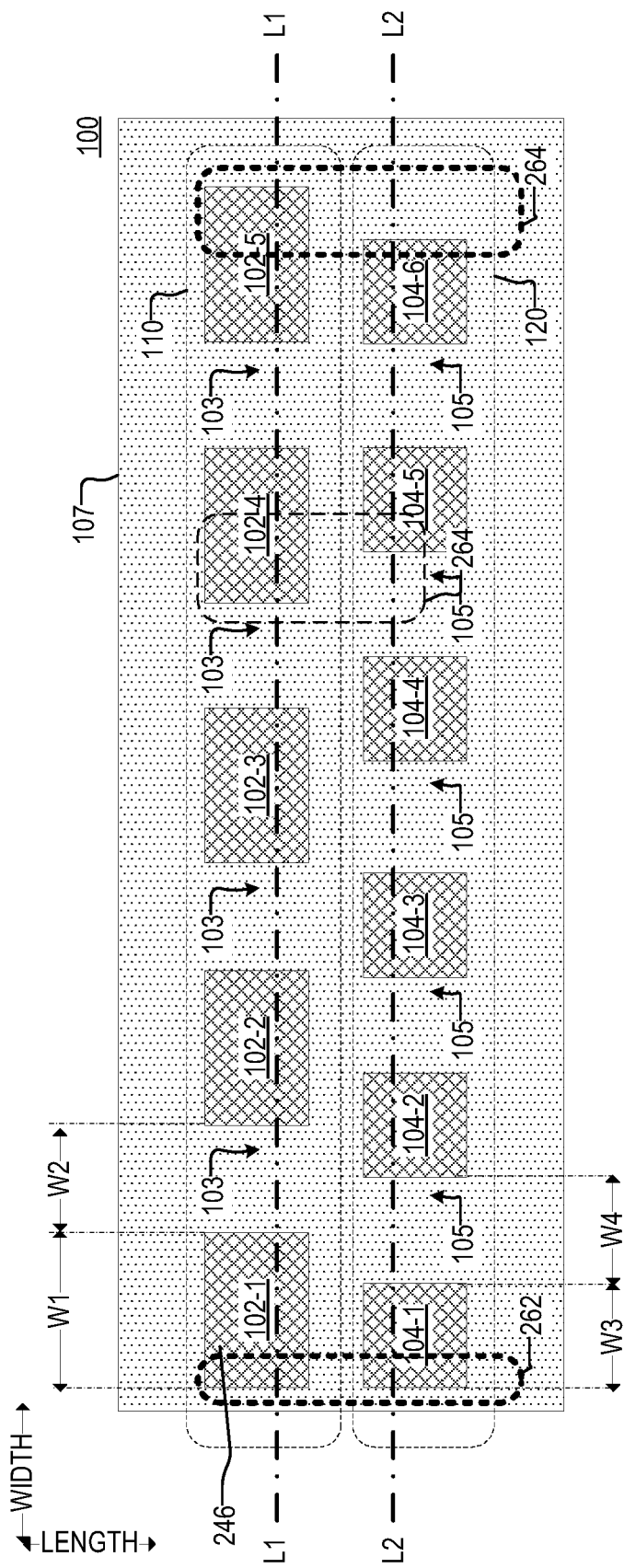
FIG. 1A is a top-down view of a target strip, according to aspects of the disclosure.

FIG. 1A is a planar top-down view of a target strip 100, according to aspects of the disclosure. The target strip 100 may include a first array 110 of conductive features 102, and a second array 120 of conductive features 104. The conductive features 102 may be arranged along a line L1-L1 and spaced apart from one another by voids 103. The conductive features 104 may be arranged along a line L2-L2 and spaced apart from one another by voids 105. Although lines L1-L1 and L2-L2 are straight lines in the present example, alternative implementations are possible in which they are curved. According to the present example, the conductive features 102 and 104 are made of metal and they are disposed on a substrate 107. The substrate 107 may be formed of any suitable type of dielectric material. The substrate 107 may be either rigid or flexible. For example, the substrate may be a plastic film. Although in the present example, the conductive features 102 and 104 are disposed on the substrate 107, alternative implementations are possible in which the conductive features 102 and 104 are integrated into the substrate 107. In such implementations, the target strip 100 may be implemented as a printed circuit board (PCB).

Array 110 may include N conductive features 102, where N is a positive integer greater than or equal to 1. Array 120 may include N+I conductive features 104, where I is an integer greater than or equal to 1. As a result of this arrangement, the target strip 100 may include a greater number of conductive features 104 than conductive features 102. Each of the conductive features 102 may have a width W1 and each of the conductive features 104 may have a width W3, where W3<W1. Each of the voids 103 may have a width W2 and each of the voids 105 may have a width W4. According to the present example, the width W2 is greater than the width W4. However, alternative implementations are possible in which the width W2 is less than or equal to the width W4. Preferably, in some implementations, W1 may be equal to W2 and W3 may be equal to W4. However, the present disclosure is not limited thereto.

In some implementations, the target strip 100 may be defined in accordance with the following equations: I=1 and N*2*W1=(N+1)*2*W3. Optionally, as noted above, W1 may be equal to W2 and W3 may be equal to W4. However, the present disclosure is not limited thereto. In other words, the widths of the conductive features in the target strip 100 may be such that the two sets of features (i.e., conductive features 102 and 104) fit in the same length. As is discussed below, a target strip that includes N conductive features 102 and N+1 conductive features 104, and which complies with the above equations, may also include at least one of: (i) one or more additional conductive features 102 (full or partial), (ii) one or more additional conductive features 104 (full or partial), and (2) one or more additional voids 103 (full or partial) and one or more and one or more additional voids 105 (full or partial). Such additional conductive features and/or voids may be provided in order to prevent the coils from running off the edge of the target (which would cause edge effects). In other words, the additional features or voids may fall outside of the stroke of the of the target strip 100. Ensuring the that the coils cannot run off the edge of the target strip 100 would, under most circumstances, improve the accuracy of measurements of the position of the target.

The conductive features 102 and 104 may extend from a first end region 262 of the target strip 100 to a second end region 264 of the target strip 100. The conductive features 102 in the array 110 may be staggered with respect to the conductive features 104 in the array 120, such that each conductive feature 102 is aligned with at least one conductive feature 104 and the void 105 that is immediately adjacent to the conductive feature 104, and separates the conductive feature 104 from a neighboring conductive feature.

In one example, the conductive feature 102-1 (shown in FIG. 1A) is aligned with the conductive feature 104-1, as well as the void 105 that separates conductive features 104-1 and 104-2. As another example, the conductive feature 102-2 is aligned with the conductive features 104-2 and 104-3, as well as the void 105 that separates conductive features 104-2 and 104-3. As yet another example, the conductive feature 102-3 is aligned with the conductive feature 104-4, as well as the void 105 that separates conductive features 104-3 and 104-4. In the example of FIG. 1A, a given conductive feature 102 is aligned with a given conductive feature 104 if the given conductive feature 102 is depicted directly above at least a portion of the given conductive feature 104. Similarly, in the example of FIG. 1A, a given conductive feature 102 is aligned with a given void 105, if the given conductive feature 102 is depicted directly above at least a portion of the given void 105. Moreover, in the example of FIG. 1A, a given conductive feature 104 may overlap with a given void 103 if the given conductive feature 104 is depicted directly below at least a portion of the given void 103. In general, two conductive features 102 and 104 may be aligned when the receiving coil arrays 212 and 216 would sense, at the same time, reflected magnetic fluxes originating from those conductive features. Or put differently, two conductive features 102 and 104 may be aligned if they are capable of being positioned under the receiving coil arrays 212 and 216 (or the sensor 210) at the same time.

In some respects, each of the conductive features 102 may be offset (along the width of the target strip 100) to a different degree from its nearest conductive feature 104. As a result of this arrangement, each location of the sensor 210 relative to the target strip 100, would correspond to a different pair (M1, M2), where M1 is the reflected magnetic flux through the receiving coil array 212 and M2 is the reflected magnetic flux through the receiving coil array 216. This in turn permits a one-to-one mapping between: (i) the location of the target 110 and (ii) the magnetic fluxes through the receiving coil arrays 212 and 216 and/or the pair of signals that are generated by the receiving coil arrays 212 and 216.

Figure 1B:
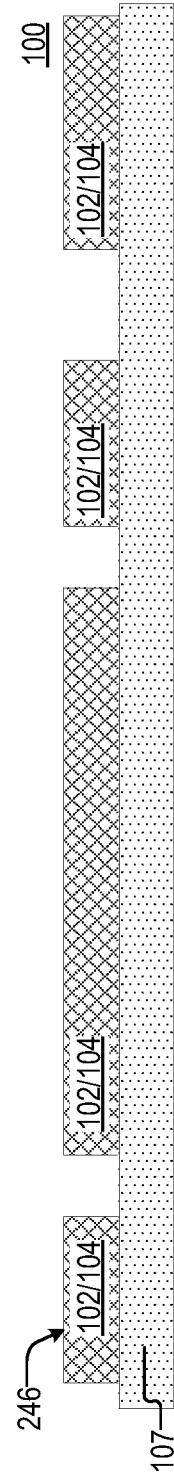
FIG. 1B is a side view of the target strip of FIG. 1A, according to aspects of the disclosure.

FIG. 1B is a planar side view of the implementation of the target strip 100, which is shown in FIG. 1A. FIG. 1B illustrates that the target strip 100 may be provided on either a rigid or flexible sheet of dielectric material. In instances in which the target strip 100 is provided on a flexible sheet of dielectric material, the target strip 100 may adhere to mechanical parts whose position is desired to be monitored in a way that conforms to the shape of the mechanical parts (e.g., see FIG. 12.). The conductive features 102 and 104 may be formed of metal and or any other suitable type of electrically conductive material. In other words, the conductive features 102 and 104 may be metal tabs that are formed by using etching, die-pressing, laser cutting, metal deposition, and/or any other suitable type of technique. By way of example, in some implementations, the conductive features 102 and 104 may be formed by taking a sheet of metal (e.g., metal foil or thicker metal sheeting) and stamping the conductive features 102 and 104 out of the metal sheet. Each of the voids 103 and 105 may be an empty space or it may be filled with another material (e.g., a dielectric material).

Figures 1C, 1D:
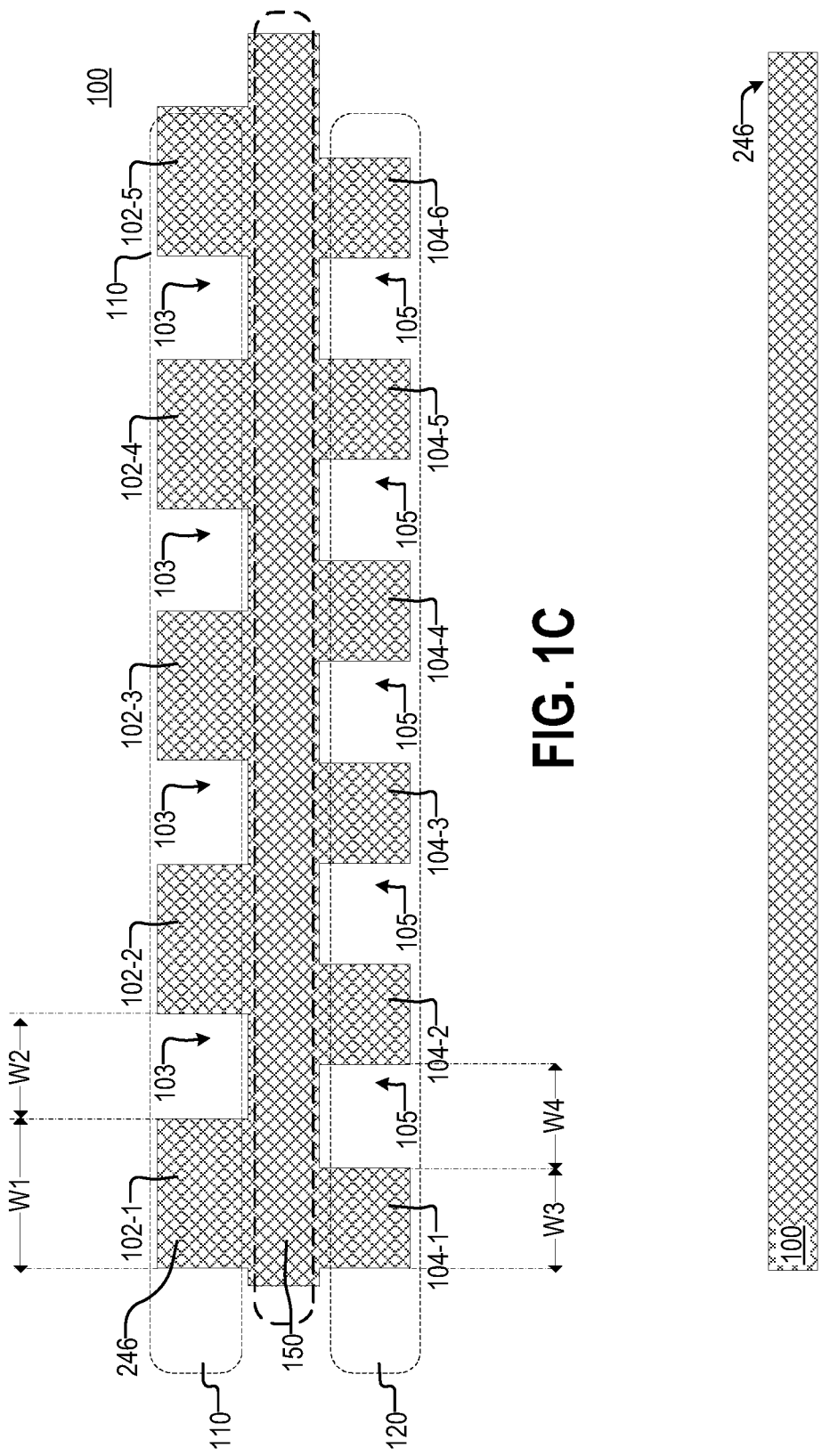
FIG. 1C is a top-down view of a target strip, according to aspects of the disclosure.
FIG. 1D is a side view of the target strip of FIG. 1C, according to aspects of the disclosure.

FIGS. 1C-D show an example of another implementation of the target strip 100, according to aspects of the disclosure. In the implementation shown in FIGS. 1C-D, the target strip 100 includes a spine 150 and the conductive features 102 and 104 are integrally formed with the spine 150. Furthermore, in the example of FIG. 100, the target strip is freestanding—in other words, it is not disposed on a substrate (because the conductive features 102 and 104 are held together by the spine 150). Although in the example of FIGS. 1C-D the target strip 100 is freestanding, alternative implementations are possible in which the target strip 100 is built into a printed circuit board or otherwise mounted on a substrate. Although in the example of FIGS. 1C-D, the spine 150 is integral with the conductive features, alternative implementations are possible in which it is not. FIG. 1D is a planar side view of the implementation of the target strip 100, which is shown in FIG. 1C. FIG. 1D illustrates that the target strip 100 may appear as a comparatively thin and elongated structure from the side.

Figure 2A:
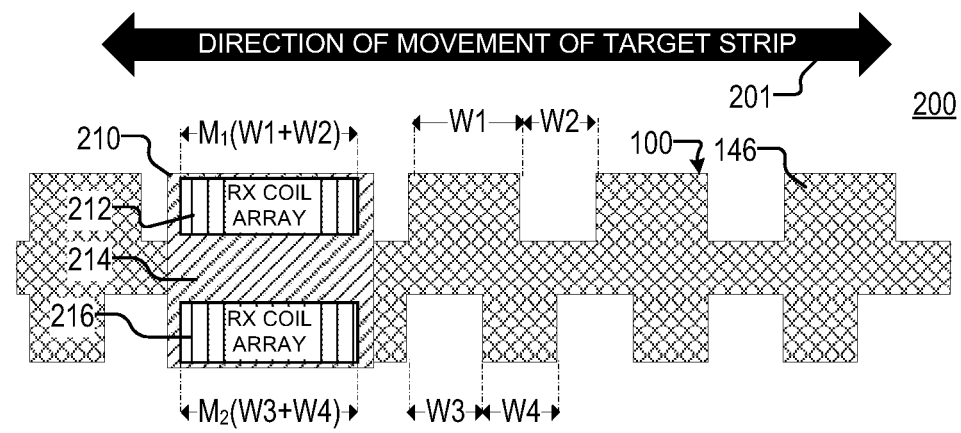
FIG. 2A is a top-down view of a system, according to aspects of the disclosure.
Figure 3:
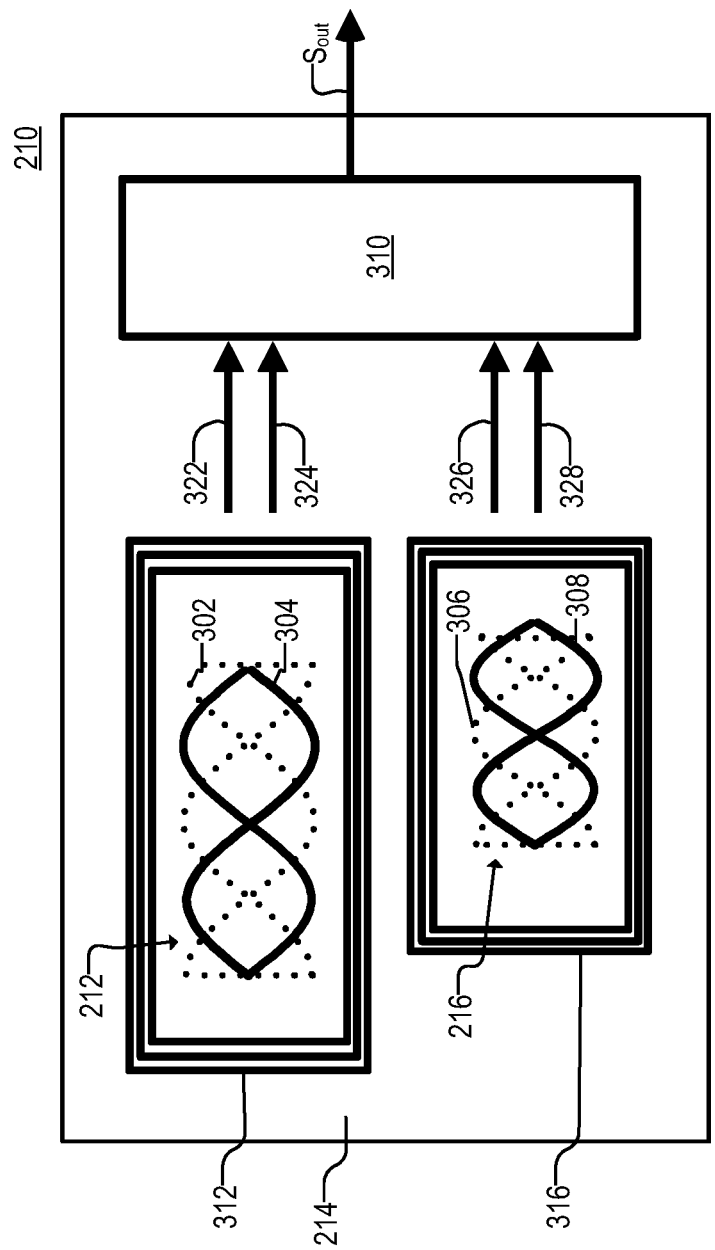
FIG. 3 is a diagram of an example of a position sensor, according to aspects of the disclosure.

FIG. 2A is a top-down view of an example of a system 200, according to aspects of the disclosure. As illustrated, the system 200 may include the target strip 100 and a position sensor 210. The position sensor 210 may be an inductive position sensor. As illustrated in FIGS. 2A and 3, the position sensor 210 may include a receiving coil array 212, a receiving coil array 216, a transmitting coil 312, a transmitting coil 316, and a processing circuitry 310 (shown in FIG. 3). The transmitting coil 312 and the receiving coil array 212 may be formed on a substrate 214. The receiving coil array 212 may be disposed inside the transmitting coil 312, as shown in FIG. 3. The receiving coil array 212 may include a receiving coil 302 and a receiving coil 304. The receiving coil 302 may be configured to have a sinusoidal response, and the receiving coil 304 may be configured to have a co-sinusoidal response. Although in the present example the coils have a sinusoidal and co-sinusoidal response, it will be understood that any set of receiving coils that produces orthogonal signals can be used. The transmitting coil 316 and the receiving coil array 216 may be formed on the substrate 214. The receiving coil array 216 may be disposed inside the transmitting coil 316, as shown in FIG. 3. The receiving coil array 212 may include a receiving coil 306 and a receiving coil 308. The receiving coil 308 may be configured to have a CO-sinusoidal response, and the receiving coil 306 may be configured to have a sinusoidal response.

Figure 2B:
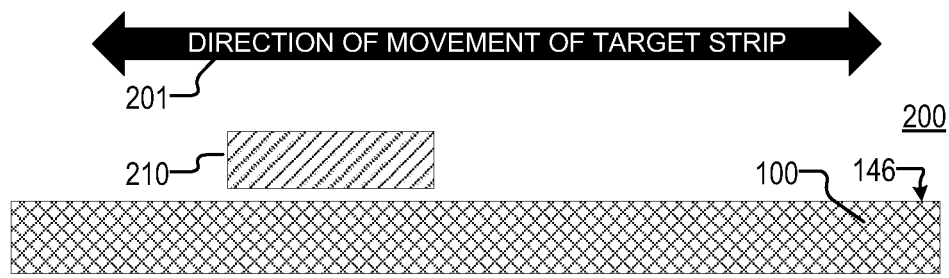
FIG. 2B is a side view of the system of FIG. 2A, according to aspects of the disclosure.

In operation, the sensor 210 may be positioned over the target strip 100, such that substrate 214 is substantially parallel to the top surface 246 of the target strip 100. The target strip 100 may perform a reciprocal motion with respect to the sensor 210, in the direction indicated by arrow 201. As the target strip 100 travels underneath the sensor 210, the transmitting coil 312 may generate a first excitation electromagnetic flux and the transmitting coil 316 may generate a second excitation electromagnetic flux. In some implementations, the first transmitting coils 312 and 316 may be different portions of a single transmitting coil—i.e., they may be run in series as one total transmitting coil. The first excitation electromagnetic flux may induce eddy currents in the conductive features 102, and the induced eddy currents may result in a first reflected electromagnetic flux being emitted from the conductive features 102. The second excitation electromagnetic flux may induce eddy currents in the conductive features 104, and the induced eddy currents may result in a second reflected electromagnetic flux being emitted from the conductive features 104. The receiving coil 302 may detect the first reflected electromagnetic flux and generate a signal 322, which is subsequently provided to the processing circuitry 310. The receiving coil 304 may detect the first reflected electromagnetic flux and generate a signal 324, which is subsequently provided to the processing circuitry 310. The receiving coil 306 may detect the second reflected electromagnetic flux and generate a signal 326, which is subsequently provided to the processing circuitry 310. The receiving coil 308 may detect the first reflected electromagnetic flux and generate a signal 328, which is subsequently provided to the processing circuitry 310. The processing circuitry 310 may generate an output signal $S_{out}$ based on the signals 322-328. The signal $S_{out}$ may be a digital signal that is indicative of the position of the target strip 100 relative to the sensor 210. Further information on the operation of inductive position sensors may be found in U.S. Pat. No. 10,866,122 entitled "Magnetic Field Sensor for Detecting an Absolute Position of a Target Object," which is herein incorporated by reference in its entirety. Although in the example of FIG. 2 the sensor 210 is an inductive position sensor, it will be understood that the concepts and ideas presented throughout the disclosure are not limited to this type of position sensor, and they can be applied to other types of position sensors, as well.

In another aspect, the receiving coil array 212 may have a width that is a multiple of the combined width of the conductive features 102 and the voids 103. For example, the width of the receiving coil array 212 may be defined by Equation 1 below:

$$\text{WIDTH}_{212} = M_1(W1 + W2) \quad (1)$$

where $\text{WIDTH}_{212}$ is the width of the receiving coil array 212, W1 is the width of any of the conductive features 102, W2 is the width of any of the voids 103, and $M_1$ is a positive integer greater than or equal to 1. According to the present disclosure, it has been determined that configuring the receiving coil array 212 to have a width that is a multiple of the combined width of the conductive features 102 and the voids 103 reduces the error that is present in the signal $S_{out}$. In some respects, to minimize stray field impact and inaccuracy (shown in FIG. 3), the receiving coil array 212 must spread over an integer number of conductive feature 102/void 103 pairs.

Additionally or alternatively, the receiving coil array 216 may have a width that is a multiple of the combined width of the conductive features 104 and voids 105. For example, the width of the receiving coil array 216 may be defined by Equation 2 below:

$$\text{WIDTH}_{216} = M_2(W3 + W4) \quad (2)$$

where $\text{WIDTH}_{216}$ is the width of the receiving coil array, W1 is the width of any of the conductive features 102, W2 is the width of any of the voids 103, and $M_2$ is a positive integer greater than or equal to 1. According to the present disclosure, it has been determined that configuring the receiving coil array 212 to have a width that is a multiple of the combined with of the conductive features 104 and voids 105 reduces the error that is present in the signal $S_{out}$. In some implementations, the value of $M_1$ may be different from the value of $M_2$. In some respects, to minimize stray field impact and angle inaccuracy (shown in FIG. 3), the receiving coil array 216 must spread over an integer number of conductive feature 104/void 105 pairs.

In some implementations, each of the arrays 110 and 120 may be configured to include at least one extra conductive feature on each one of its sides. Under this arrangement, the first and last conductive features in each of the arrays 110 and 120 may not travel under (or past) the sensor 210 when the reciprocal motion is performed to its full extent by the target strip 100 in one direction or the other In other words, the number of conductive features in each of arrays 110 and 120 may be selected, such that when the target strip 100 has moved all the way in one direction or the other, there would remain at least one conductive feature in each of arrays 110 and 120 that is not under and/or has not travelled past the sensor 210. According to the present disclosure, it has been determined that configuring the target strip in this manner helps remove peaks in the error of the signals produced by receiving coil arrays 212 and 216 which would occur if the last or first conductive feature in one of the arrays 110 and 120 is under (or has traveled past) a respective one of the receiving coil arrays 110 and 120. In the example of FIGS. 1A-3, the conductive features 102-1 and 104-1 are the first features of arrays 110-120, and conductive features 102-5 and 104-6 are the last features of arrays 110-120.

Figure 4A:
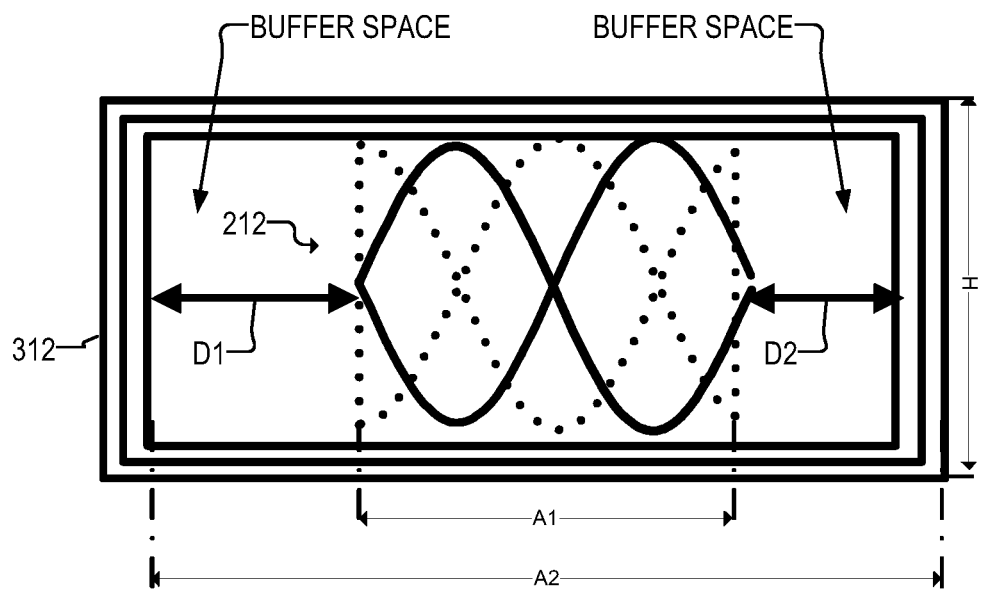
FIG. 4A is a diagram of an example of a coil array, according to aspects of the disclosure.

FIG. 4A shows an example of one possible configuration of the receiving coil array 212. In the example of FIG. 4A, the receiving coil array 212 may have a width A1 and the transmitting coil 312 may have a width A2 that is greater than the width A1 by a margin that permits one side of the receiving coil array 212 to be spaced by a distance D1 from the transmitting coil 312 and the other side of the receiving coil array 212 to be spaced by a distance D2 from the transmitting coil 312. According to the present example, the distance D1 is the same as the distance D2, however alternative implementations are possible in which they are different. According to the present disclosure, it has been determined that sizing the receiving coil array 212 in a manner that leaves respective buffer spaces between the sides of the receiving coil array 212 and the transmitting coil 312 results in improved performance of the receiving coil array 212. The nature of the improvement is illustrated in the plots shown in FIGS. 5A-5B.

Figure 5A:
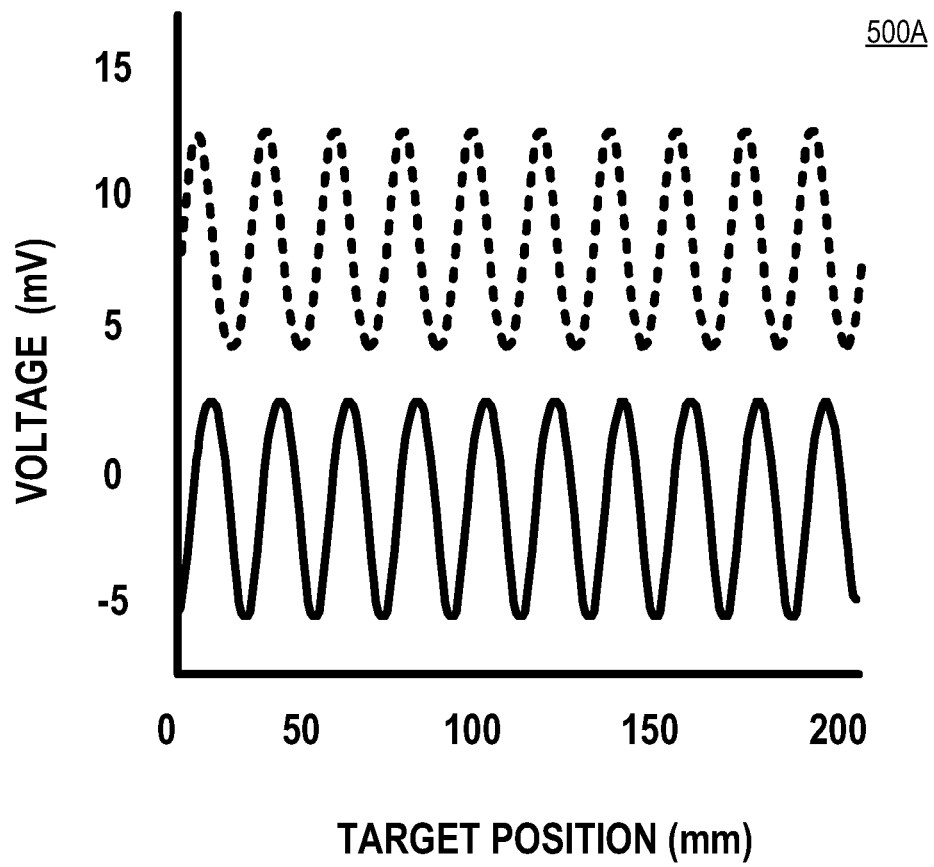
FIG. 5A is a plot illustrating aspects of the operation of a coil array that lacks buffer spaces, according to aspects of the disclosure.
Figure 5B:
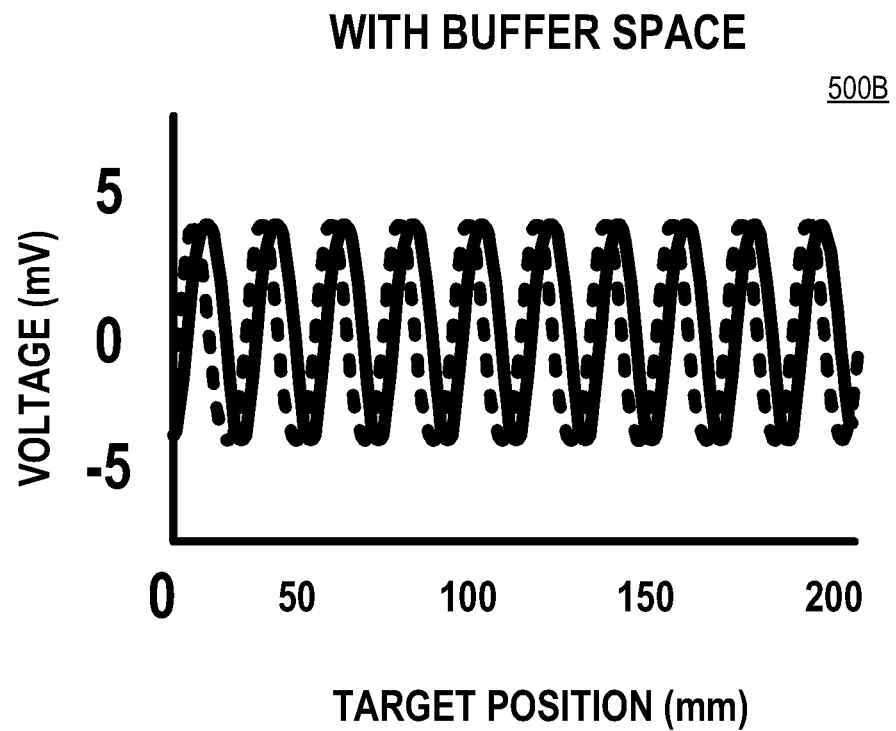
FIG. 5B is a plot illustrating aspects of the operation of a coil array that includes buffer spaces, according to aspects of the disclosure.

Shown in FIG. 5A is a plot 500A of the signals generated by the receiving coils 302 and 304 (which form the receiving coil array 212) when no buffer space is left between the coil array 212 and the transmitting coil 316. An example of a configuration in which no buffer space is provided between the receiving coil array 212 and the transmitting coil 312 can be seen in FIG. 6. Shown in FIG. 5B is a plot 500B of the signals generated by the coils 302 and 304 (which form the coil array 212) when buffer spaces are provided between the coil array 212 and the transmitting coil 316. An example of a configuration in which buffer space is provided between the receiving coil array 212 and the transmitting coil 312 is shown in FIG. 4A. The plots in FIGS. 5A-B illustrate that providing buffer spaces between the receiving coil array 212 and the transmitting coil 312 may reduce the offset between the signals generated by coils 302 and 304, thus improving the accuracy of the sensor 210. In the absence of buffer spaces, the offset may appear because the vertical traces of the transmitting coil 312 (i.e., the traces that are separated by distances D1/D2 in FIG. 4A) would produce mutual inductance with the receiving coil array 212. Because of its symmetry, the cosine coil (i.e., coil 304) may have no mutual inductance with the sides of the transmitting coil 312, but the sine coil (i.e., coil 302) may have none or negligible mutual inductance, which in turn would result in the signals generated by the two coils being offset in the absence of buffer space.

Figure 4B:
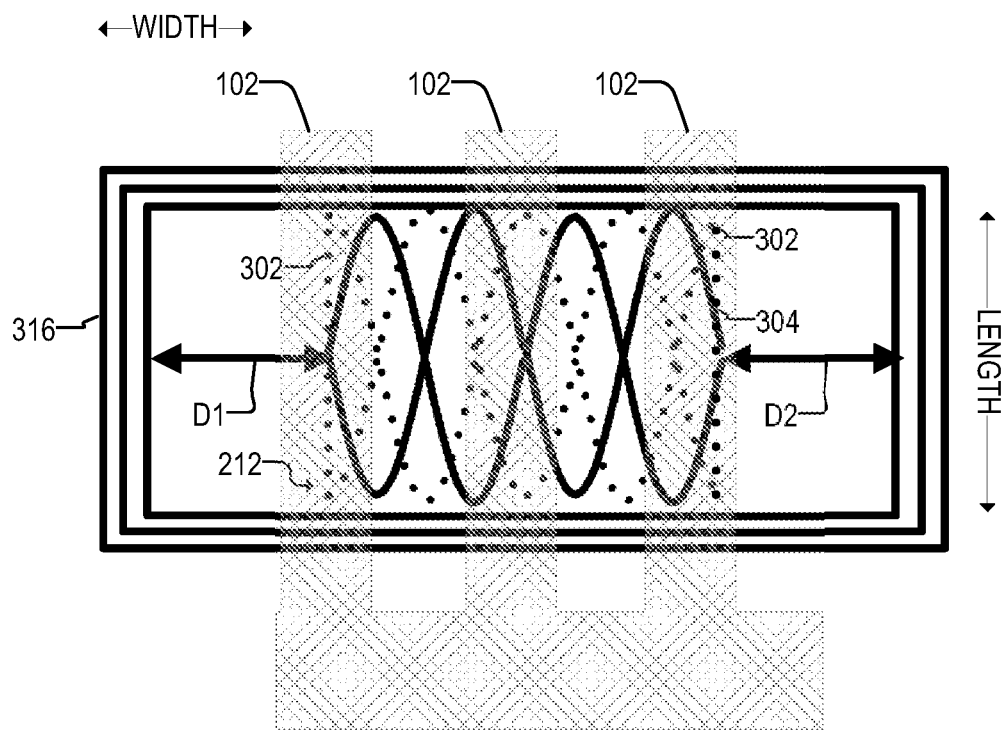
FIG. 4B is a diagram of an example of a coil array, according to aspects of the disclosure.

FIG. 4B is a diagram illustrating an example of another optimization of the receiving coil array 212. In the example of FIG. 4B, the width of the receiving coil array 212 is increased to cover multiple periods of the target strip 100 (by increasing the number of loops in the receiving coils while maintaining the same size and shape of the loops). FIG. 4B illustrates that increasing the width of the received coil array 212 over several conductive features of the target strip 100 may help increase the amplitude and reduce the angle error of the signals that are generated by the coils 302 and 304 (which are part of the receiving coil array 212). The strength of the signals generated by the receiving coils 302 and 304 increases linearly (e.g., signals 322 and 324) with increases in the width of the receiving coils 302 and 304.

FIG. 4C is a diagram illustrating an example of another optimization of the receiving coil array 212. In the example of FIG. 4C, the coil 302 is incudes a first portion having a phase of X degrees and a second portion having a phase of X+45 degrees. Similarly, coil 304 includes a first portion having a phase of Y degrees and a second portion having a phase of Y+45 degrees. According to the present disclosure, it has been determined that using phase-shifted loops in any of the receiving coil arrays 212 and 216 may help increase the amplitude of the signals that are produced by the receiving coil arrays. In some instances, adding phase-shifted loops to the receiving coil arrays 212 and 216 would result in the output signals of the receiving coil arrays 212 and 216 being phase-shifted, as well. However, this will have no impact on the coils if the receiving coil arrays 212 and 216 use the same phase shift. Furthermore, in some instances, the coil 302 may include many phase-shifted turns that result in zero phase shift total (e.g., a −45 degree turn and a +45 degree turn). In any event, benefits of using phase shifted coils may include increased signal, reduced harmonic errors, as well as reduced offset errors.

Although in the present example each of the receiving coils in the receiving coil arrays 212 and 216 includes two phase-shifted loops, alternative implementations are possible in which any of the receiving coils includes any number of receiving coils. The table below illustrates the amount of improvement that can be achieved by adding phase shifted loops to each of receiving coils 304 and 308. The first (top) row illustrates the amplitude of signals that are output by receiving coils 304 and 308 when each of them includes only one loop. The second row illustrates the amplitude of signals that are output by receiving coils 304 and 308 when each of them includes two coils that are phase-offset from each other by 45 degrees. The third row illustrates the amplitude of signals that are output by receiving coils 304 and 308 when each of them is provided with three phase-shifted loops. In the example of the third row, the phase offset between the first and second loops is 22.5 degrees and the phase offset between the second and third loops (in each of the receiving cols) is also 22.5 degrees. The fourth (bottom) row illustrates the amplitude of signals that are output by receiving coils 304 and 308 when each of them is provided with three phase-shifted loops. In the example of the fourth row, the phase offset between the first and second loops is 11.25 degrees and the phase offset between the second and third loops (in each of the receiving cols) is 33.75 degrees.

| Number of Loops in Each of Receiving Coils 304 and 308 | Phase Shift Between the Loops | Amplitude of Signal Output from Receiving Coil 304 | Amplitude of Signal Output from Receiving Coil 308 |
| --- | --- | --- | --- |
| 1 | 0° | 5.8 | 4.9 |
| 2 | 0°; 45° | 10.9 | 8.6 |
| 3 | 0°; 22.5°; 45° | 16.8 | 13.2 |
| 3 | 0°:11.25°:45° | 28.3 | 22 |

Although the examples of FIGS. 4A-C and 5A-B are provided with respect to the receiving coil array 212 and the transmitting coil 312, it will be understood that the same optimizations may be performed on the receiving coil array 216 and the transmitting coil 316, as well.

Figure 6:
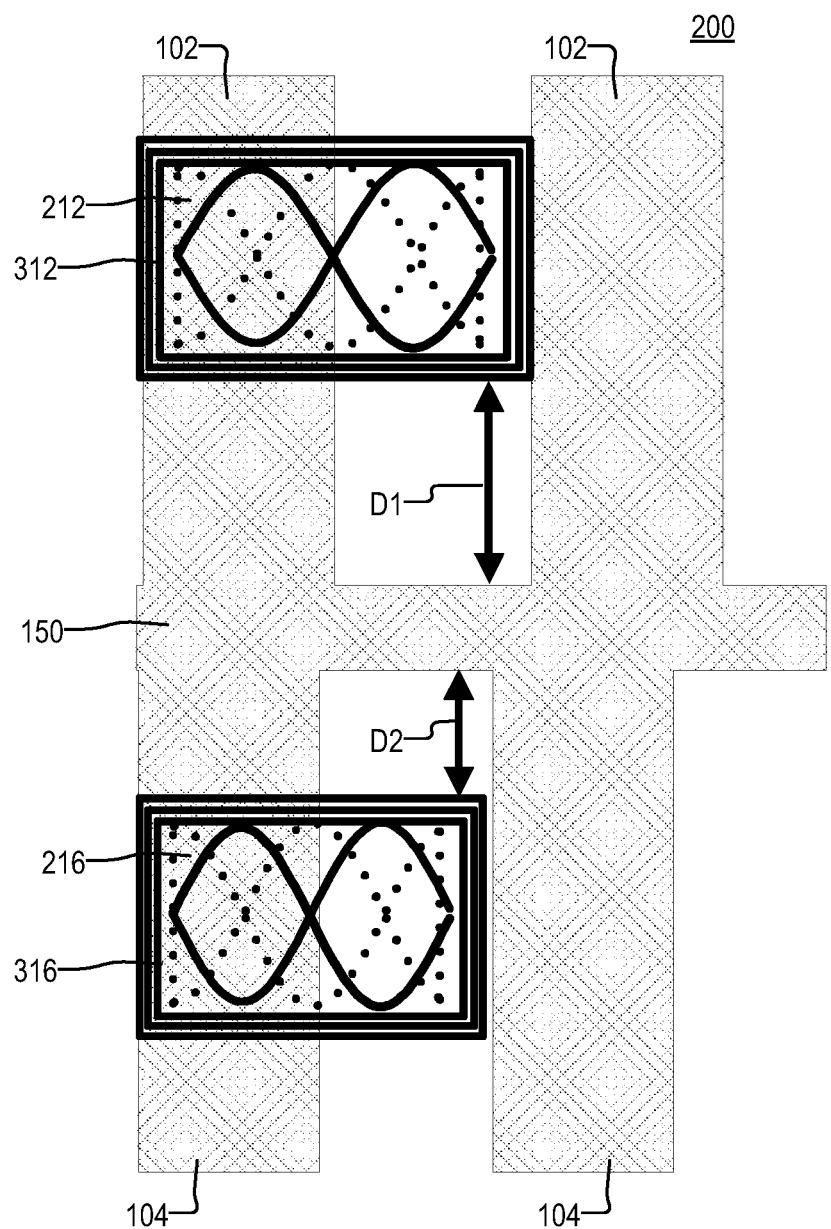
FIG. 6 is a partial view of a system, according to aspects of the disclosure.

FIG. 6 is a diagram of a portion of the system 200, in accordance with another implementation. According to the present disclosure, it has been determined that the presence of the spine 150 in the target strip 100 may increase the angle error in signals 322-328. In this regard, FIG. 6 shows an optimization that can reduce the amount of angle error in the signals 322-328 that is caused by the presence of the spine 150 in the target strip 100. In the example of FIG. 6, the transmitting coil 312 and the coil array 212 are spaced from the spine 150 by a distance D1, and the transmitting coil 316 and the coil array 216 are spaced from the spine 150 by a distance D2. According to the present example, the distance D1 is the same as the distance D2, however alternative implementations are possible in which the distance D1 is different from the distance D2. According to the present disclosure, it has been determined that, when the width of the coils is 20 mm, setting the distances D1 and D2 to values greater than 4 mm can help reduce angle error in the signals generated by the coils 302 and 304.

Figure 7A:
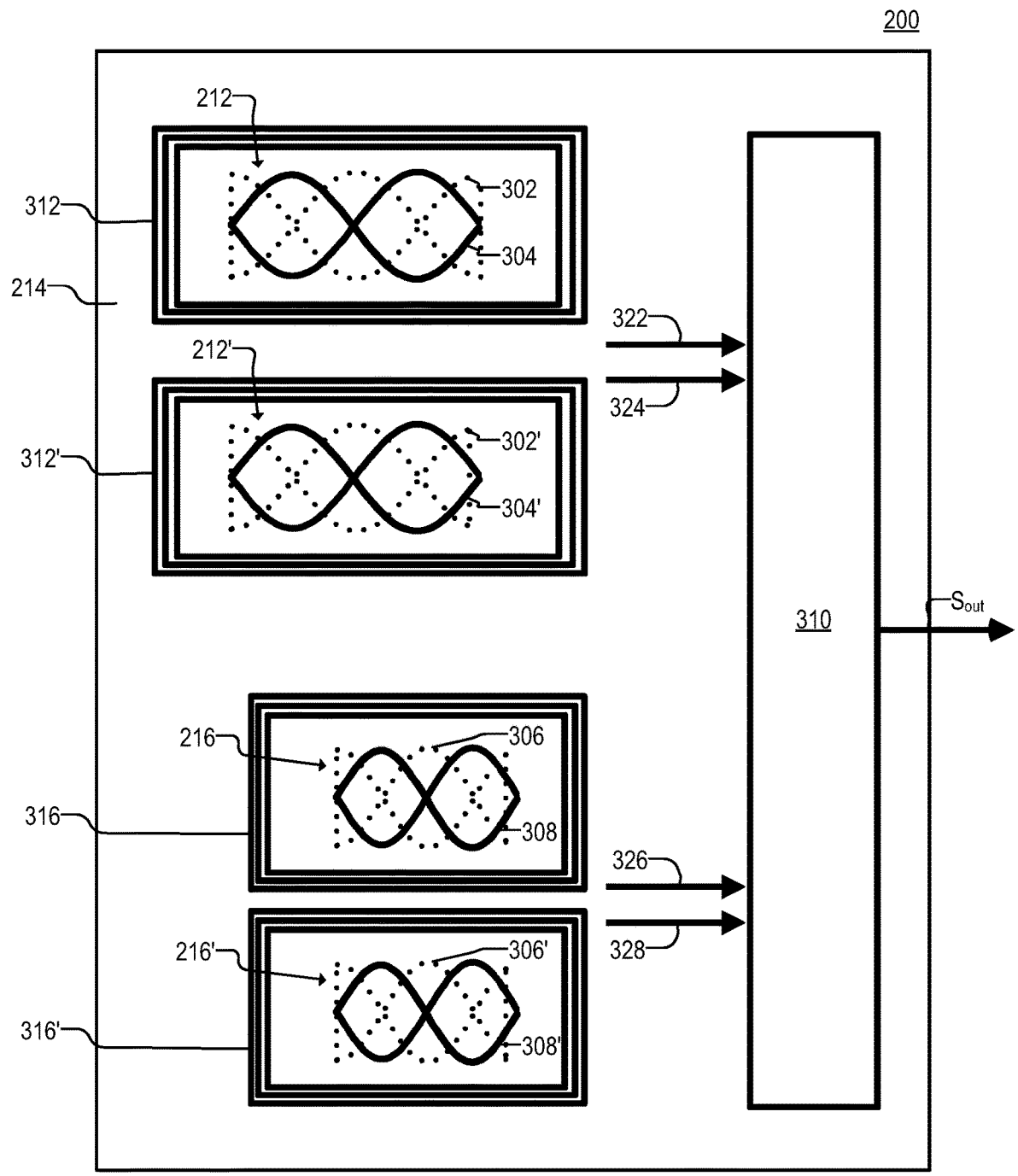
FIG. 7A is a diagram of a position sensor, according to aspects of the disclosure.

FIG. 7A is a diagram of a portion of the system 200, in accordance with another implementation. In the example of FIG. 7A, the receiving coil arrays 212 and 216 and the transmitting coils 312 and 316 are duplicated. In this regard, in the example of FIG. 7A, the sensor 200 further includes a receiving coil array 212', a receiving coil array 216', a transmitting coil 312', and a transmitting coil 316', all of which are formed on the substrate 214.

The receiving coil array 212' may be the same or similar to the receiving coil array 212. The receiving coil array 212' may be formed inside the transmitting coil 312'. The receiving coil array 212' may include coils 302' and 304', as shown. Coil 302' may have a sinusoidal response and coil 304' may have a co-sinusoidal response. In some implementations, the coils 302 and 302' may have opposite polarities and the coils 304 and 304' may also have opposite polarities. In the example of FIG. 7A, the signal 322 may be generated by subtracting the received signals that are output by the coils 302 and 302' and the signal 324 may be generated by subtracting the received signals produced by the coils 304 and 304'.

The receiving coil array 216' may be the same or similar to the receiving coil array 216. The receiving coil array 216' may be formed inside the transmitting coil 316'. The receiving coil array 216' may include coils 306' and 308', as shown. Coil 306' may have a sinusoidal response and coil 308' may have a co-sinusoidal response. In some implementations, the coils 306 and 306' may have opposite polarities and the coils 308 and 308' may also have opposite polarities. In the example of FIG. 7A, the signal 326 may be generated by subtracting the received signals that are output by the coils 306 and 306' and the signal 328 may be generated by subtracting the received signals produced by the coils 308 and 308'.

Figure 7B:
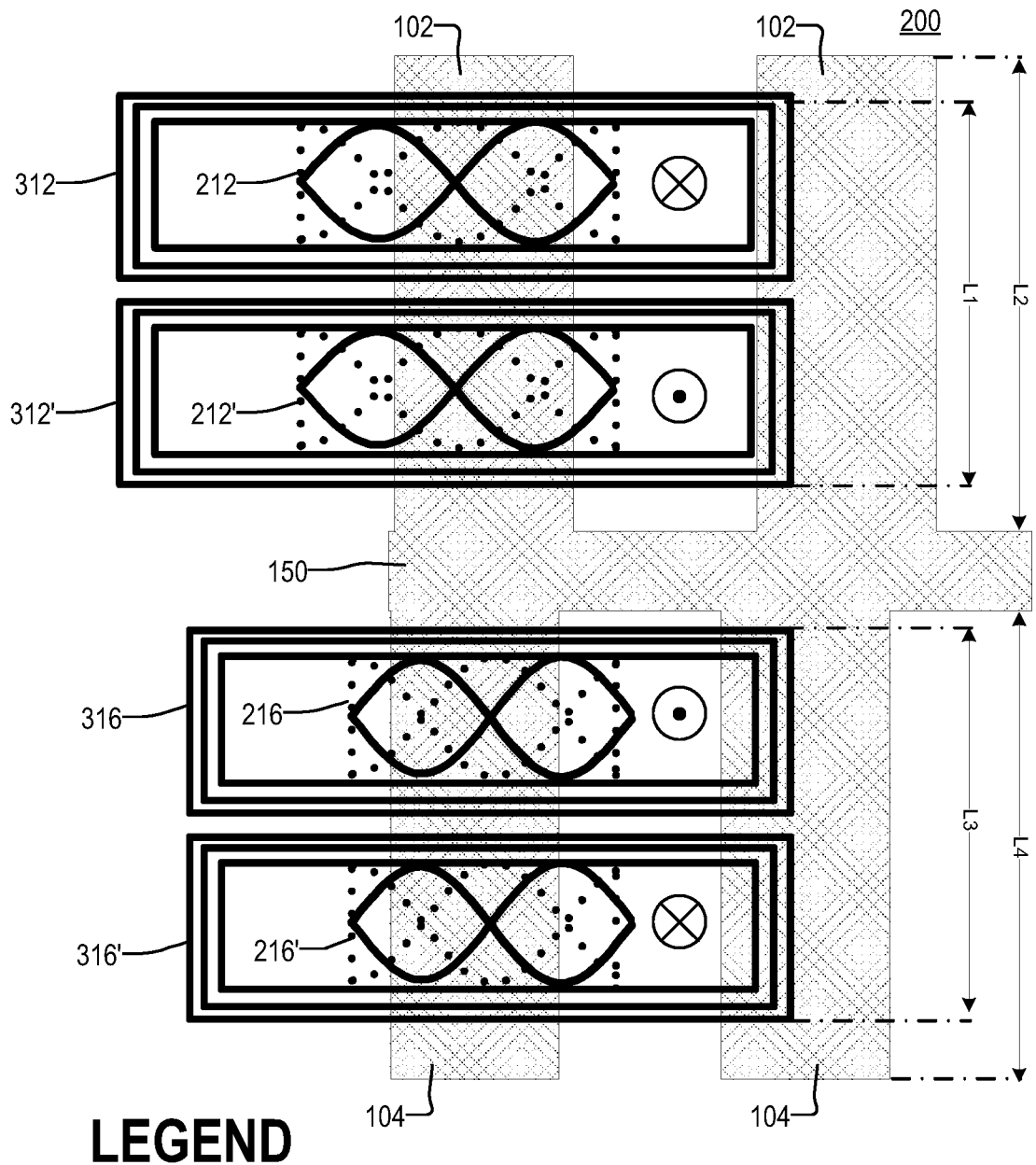
FIG. 7B is a partial diagram of a system that includes the position sensor of FIG. 7A, according to aspects of the disclosure.

FIG. 7B is a diagram illustrating an example of the operation of the implementation of the sensor 210, which is shown in FIG. 7A. In the example of FIG. 7B, the conductive features 102 and 104 are sufficiently long to accommodate the additional transmitting/receiving coils. Specifically, the transmitting coils 312 and 312' may have a combined length L1 that is smaller than the length of the L2 of the conductive features 102, and the transmitting coils 316 and 316' may have a combined length L3 that is smaller than the length L4 of the conductive features 104. As illustrated, the receiving coil arrays 212 and 212', as well as the transmitting coils 312 and 312', may be positioned over the conductive features 102. Similarly, the receiving coil arrays 216 and 216', as well as the transmitting coils 316 and 316', may be positioned over the conductive features 104. Duplicating the coils on each side of the spine 150 is advantageous because it may increase the magnetic coupling between sensor 210 and the target strip 100. This is because most of the coupling between the receiving coil arrays and the target strip 100 takes place in proximity to the transmitter coils. Furthermore, imparting opposite polarities on the receiving coils that are disposed on the same side of the spine 150 is advantageous because it reduces cross-talk talk between any of the receiving coil arrays that are disposed on one side of the spine 150 and the conductive features that are disposed on the other side.

Figure 8:
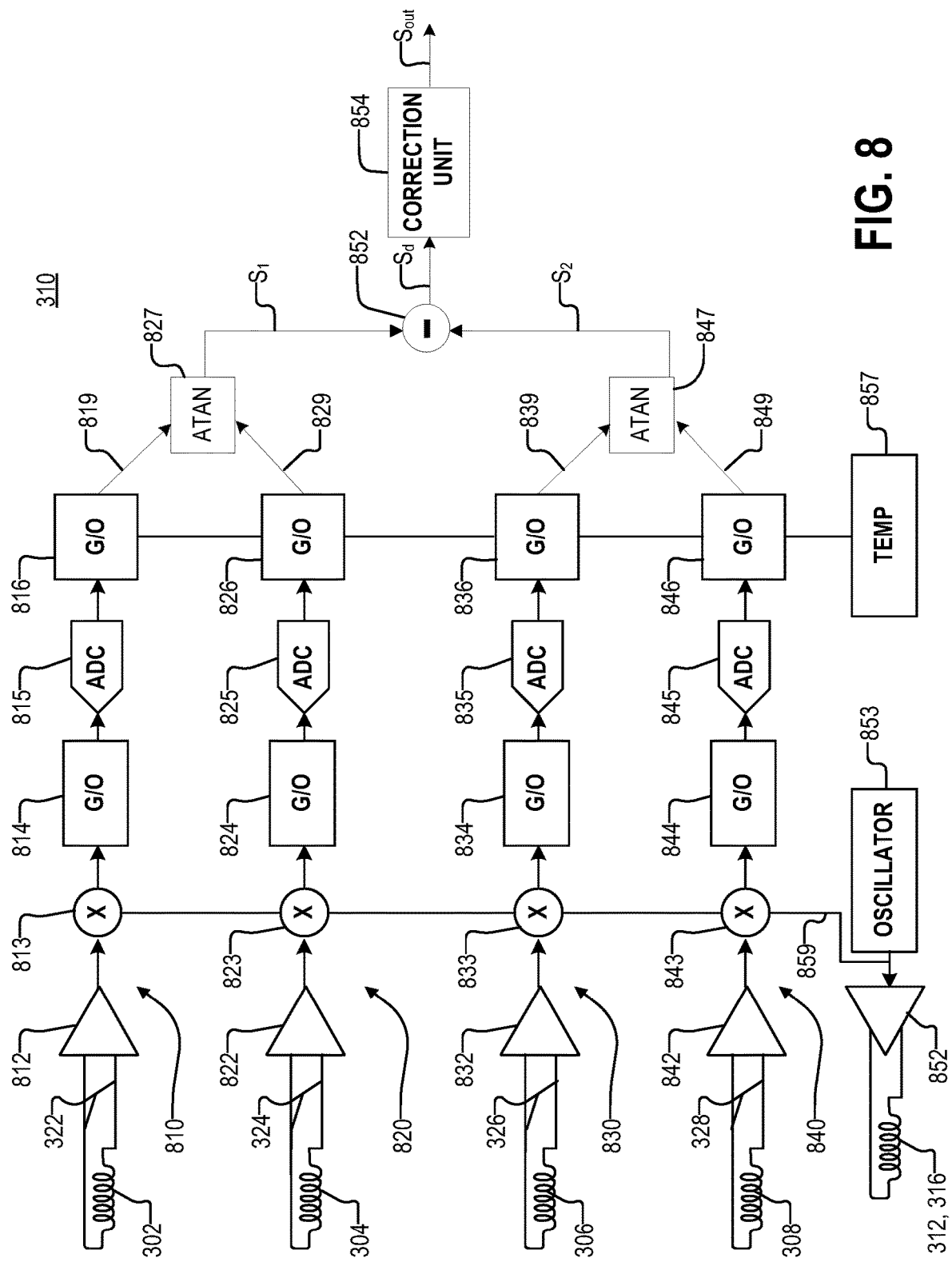
FIG. 8 is a diagram of processing circuitry that is part of a position sensor, according to aspects of the disclosure.

FIG. 8 is a diagram of the processing circuitry 310, according to one implementation. As illustrated, the processing circuitry may include channels 810-840, an oscillator 853, a driver 852, an arctan unit 827, an arctan unit 847, a subtraction unit 852, a correction unit 854, and a temperature sensor 857. The driver 852 may be configured to drive the transmitting coils 312 and 316 in response to a signal 859 that is provided by the oscillator 853.

The channel 810 may include an amplifier 812, a demodulator 813, a gain/offset adjustment unit 814, an analog-to-digital converter (ADC) 815, and a gain/offset adjustment unit 816. The amplifier 812 may receive the signal 322 from the coil 302 and amplify the received signal. The demodulator 813 may demodulate the amplified signal based on the signal 859, which is generated by the oscillator 853. The gain/offset adjustment unit 814 may perform coarse gain and/or offset adjustment of the demodulated signal to center the demodulated signal into the ADC 815. The ADC 815 may digitize the signal output from the gain/offset adjustment unit 814. The gain/offset adjustment unit 816 may generate a signal 819 by performing temperature compensation and/or any other type of adjustment on the digitized signal that is output by the ADC 815. The gain/offset adjustment unit 816 may provide the signal 819 to the arctan unit 827.

The channel 820 may include an amplifier 822, a demodulator 823, a gain/offset adjustment unit 824, an analog-to-digital converter (ADC) 825, and a gain/offset adjustment unit 826. The amplifier 822 may receive the signal 324 from the coil 304 and amplify the received signal. The demodulator 823 may demodulate the amplified signal based on the signal 859 which is generated by the oscillator 853. The gain/offset adjustment unit 824 may perform coarse gain and/or offset adjustment of the demodulated signal to center the demodulated signal into the ADC 825. The ADC 825 may digitize the signal output from the gain/offset adjustment unit 824. The gain/offset adjustment unit 826 may generate a signal 829 by performing temperature compensation and/or any other type of adjustment on the digitized signal that is output by the ADC 825. The gain/offset adjustment unit 826 may provide the signal 829 to the arctan unit 827.

The channel 830 may include an amplifier 832, a demodulator 833, a gain/offset adjustment unit 834, an analog-to-digital converter (ADC) 835, and a gain/offset adjustment unit 836. The amplifier 832 may receive the signal 326 from the coil 306 and amplify the received signal. The demodulator 833 may demodulate the amplified signal based on the signal 859 which is generated by the oscillator 853. The gain/offset adjustment unit 834 may perform coarse gain and/or offset adjustment of the demodulated signal to center the demodulated signal into the ADC 835. The ADC 835 may digitize the signal output from the gain/offset adjustment unit 834. The gain/offset adjustment unit 836 may generate a signal 839 by performing temperature compensation and/or any other type of adjustment on the digitized signal that is output by the ADC 835. The gain/offset adjustment unit 836 may provide the signal 839 to the arctan unit 847.

The channel 840 may include an amplifier 842, a demodulator 843, a gain/offset adjustment unit 844, an analog-to-digital converter (ADC) 845, and a gain/offset adjustment unit 846. The amplifier 842 may receive the signal 328 from the coil 308 and amplify the received signal. The demodulator 843 may demodulate the amplified signal based on the signal 859 which is generated by the oscillator 853. The gain/offset adjustment unit 844 may perform coarse gain and/or offset adjustment of the demodulated signal to center the demodulated signal into the ADC 845. The ADC 845 may digitize the signal output from the gain/offset adjustment unit 844. The gain/offset adjustment unit 846 may perform temperature compensation and/or any other type of adjustment on the digitized signal, and provide a signal 849 to an arctan unit 847.

The arctan unit 827 may calculate the arctangent of the quotient of the signals 819 and 829 to produce a signal $S_1$. The signals 819 and 829 have sinusoidal and co-sinusoidal waveforms as a result of the response of coils 302 and 304. Accordingly, the signal $S_1$ may indicate _the phase of conductive features 102_. However, the signal $S_1$ alone is not sufficient to identify the absolute position of the target strip 100 relative to the sensor 210. A plot of the signal $S_1$ is shown in FIG. 10C.

The arctan unit 847 may calculate the arctangent of the quotient of the signals 839 and 849 to produce a signal $S_2$. The signals 839 and 849 have sinusoidal and co-sinusoidal waveforms as a result of the response of coils 306 and 308. Accordingly, the signal $S_2$ may indicate _the phase of conductive features 104_. However, the signal $S_2$ alone is not sufficient to identify the absolute position of the target strip 100 relative to the sensor 210. A plot of the signal $S_2$ is shown in FIG. 10C.

The subtraction unit 852 is configured to generate a signal $S_d$ by subtracting the signal $S_2$ from the signal $S_1$. The signal $S_d$ may indicate the absolute position of the target strip 100 relative to the sensor 210. This is made possible because the conductive features 104 are staggered with the conductive features 102, which causes each of the conductive features 102 to overlap to a different degree with one of the conductive features 104. As noted above, at any given time, the sensor 210 measures the reflected electromagnetic fluxes that are generated by a pair of overlapping features 102 and 104. Because the overlapping features 102 and 104 in each pair overlap to a different degree, the difference between magnetic flux through the receiving coil array 212 (which is attributable to the conductive feature 102) and the magnetic flux through the receiving coil array 216 (which is attributable to the conductive feature 104) can be uniquely attributed to a specific position of the target strip 100 relative to the sensor 210. A plot of the signal $S_d$ is shown in FIG. 10C.

The correction unit 854, is configured to receive the signal Sd and generate the output signal $S_{out}$ based on the signal $S_d$. Specifically, the correction unit 854 may generate the output signal $S_{out}$ by executing a process for removing the error that is present in the signal Sd. The process is discussed in further detail with respect to FIGS. 9A-B.

FIG. 8 is provided as an example only. It will be understood that the present disclosure is not limited to any specific implementation of the processing circuitry 310. Although in the present example the signal $S_{out}$ is output from the sensor 210, as is, alternative implementations are possible in which further processing, such as additional trimming and/or linearization, is performed on the signal $S_{out}$ before it is output. In this regard, the phrases "output signal" or "output signal $S_{out}$", as used in the context of FIGS. 8 and 9A-B, shall refer to the signal that is output by the correction unit 854 and/or the signal that is generated by executing the process described with respect to FIGS. 9A-B, irrespective of whether this signal is fed directly to external circuitry or used as a basis for generating another output signal that is itself provided to the external circuitry. The term "unit" as used herein may refer to electronic circuitry configured to perform an action, software configured to perform the action, and/or a combination of software and hardware that are configured to perform the action.

Figure 9A:
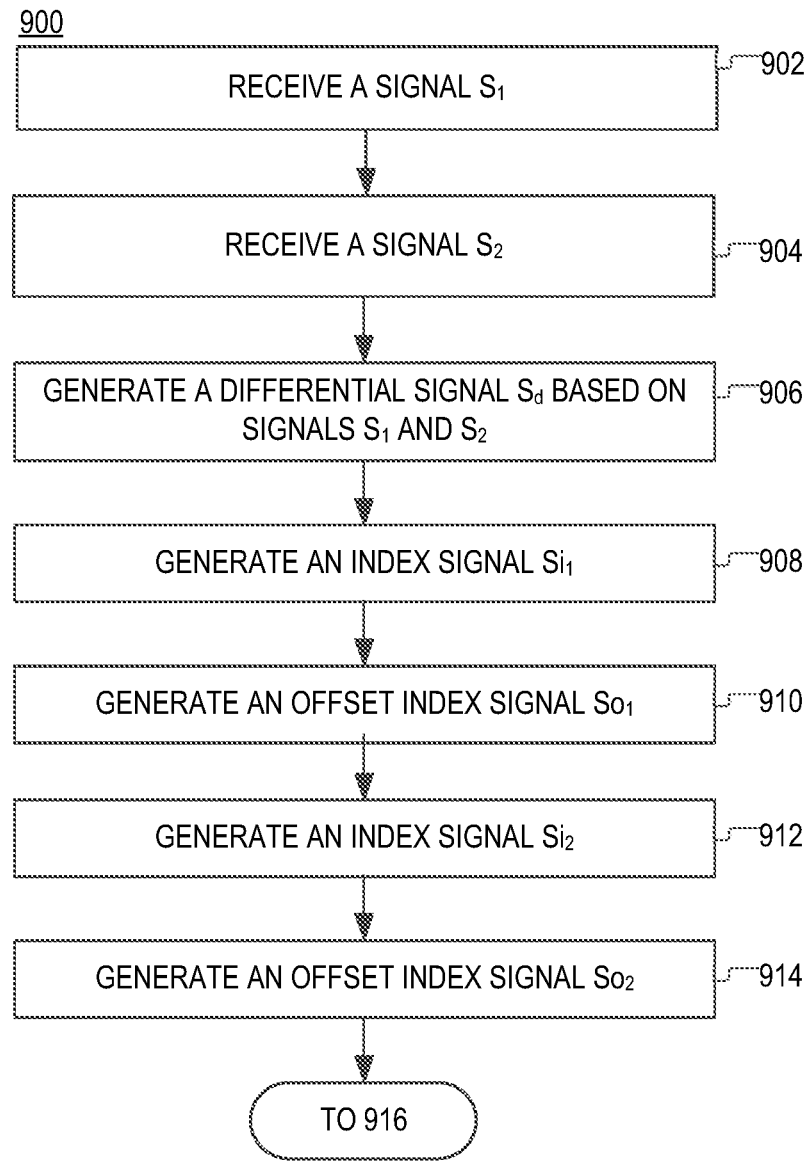
FIG. 9A is a flowchart of an example of a process, according to aspects of the disclosure.
Figure 9B:
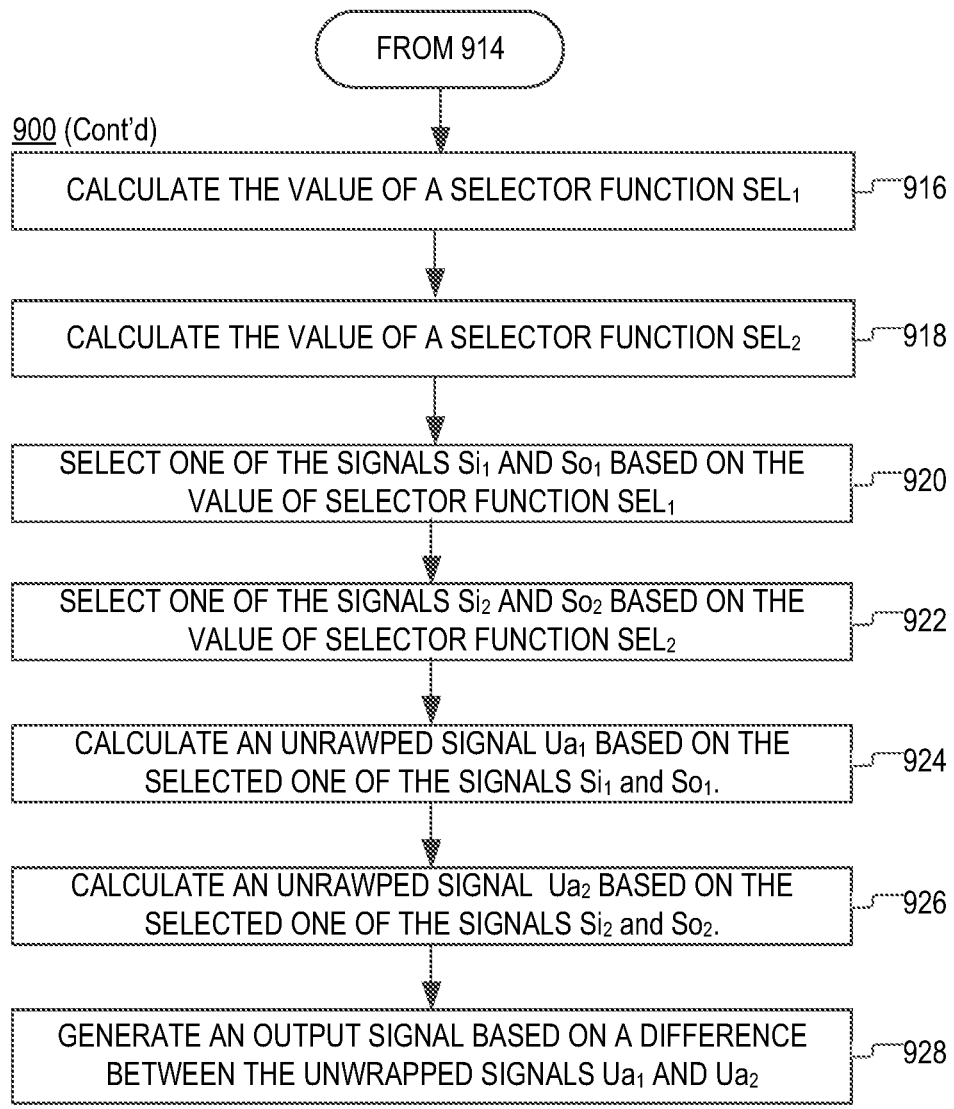
FIG. 9B is a flowchart of an example of a process, according to aspects of the disclosure.

FIGS. 9A-B show a flowchart of an example of a process 900, according to aspects of the disclosure.

At step 902, the subtraction unit 852 receives the signal $S_1$. At step 904, the subtraction unit 852 receives the signal $S_2$. At step 906, the subtraction unit 852 generates the differential signal $S_d$ by subtracting the signal $S_2$ from the signal $S_1$.

At step 908, the correction unit 854 generates an index signal $Si_1$. The index signal $Si_1$ identifies the index of the conductive feature 102 that is in closest proximity to the receiving coil array 212 (i.e., closest proximity among all conductive features 102 in the target strip 100). For example, if the target feature 102-1 is directly underneath or in closest proximity to the receiving coil array 212, the signal $Si_1$ would have the value of '1'; if the target feature 102-2 is directly underneath or in closest proximity to the receiving coil array 212, the signal $Si_1$ would have the value of '2'; if the target feature 102-3 is directly underneath or in closest proximity to the receiving coil array 212, the signal $Si_1$ would have the value of '3'; if the target feature 102-4 is directly underneath or in closest proximity to the receiving coil array 212, the signal $Si_1$ would have the value of '4'; and if the target feature 102-5 is directly underneath or in closest proximity to the receiving coil array 212, the signal $Si_1$ would have the value of '5'.

In some implementations, the signal $Si_1$ may be generated by rounding (up or down) the ratio of the signal $S_d$ and the period of the array 110 of conductive features. In some implementations, the signal $Si_1$ may be calculated based on Equation 3 below:

$$Si_1 = \left\lfloor \frac{S_d}{\frac{360}{N}} \right\rfloor \qquad (3)$$

where N is the number of conductive features in the array 110 and (360/N) is the period of the array 110. The constant '360' is the maximum value of the signal $S_d$. As used throughout the disclosure, the phrase "period of an array of conductive features" may refer to any value that is related to the density of the conductive features along the width of a target strip. In the present example, the period of the array 110 is represented as the inverse of the density of conductive features 102 per unit of signal $S_d$.

At step 910, the correction unit 854 calculates an offset index signal $So_1$. In some implementations, the signal $Si_1$ may be generated by offsetting and rounding down the ratio of the signal $S_d$ and the period of the array 110 of conductive features. In some implementations, the signal $So_1$ may be calculated based on Equations 4 and 5 below:

$$So_1 = \left\lfloor \frac{S_d}{\frac{360}{N}} + K \right\rfloor \tag{4}$$

$$K = \frac{1}{2} \tag{5}$$

where K is an offset constant. According to the present example, K is equal to 0.5. The value of K may be derived using equation 5 above. As can be readily appreciated, the signal $So_1$ is an alternative index signal. The signal $So_1$ would be equal to the signal $Si_1$ in circumstances when a given one of the conductive features 102 is distinctly most proximate to the receiving coil array 212 (i.e., when the given conductive feature 102 is directly under receiving coil array 212). The signal $So_1$ would be greater (by 1) than the signal $Si_0$ when the two different conductive features are at roughly the same distance from the receiving coil array 212, but due to noise and other uncertainties in the processing pipeline, it is unclear which one is the closest. In other words, under many (or ideally all) circumstances, one of the signals $So_1$ and $Si_1$ is always guaranteed to identify correctly the index of the target feature 102 that is in closest proximity to the receiving coil array 212.

At step 912, the correction unit 854 generates an index signal $Si_2$. The index signal $Si_2$ identifies the index of the conductive feature 104 that is in closest proximity to the receiving coil array 216 (i.e., closest proximity among all conductive features 104 in the target strip 100). For example, if the target feature 104-1 is directly underneath or in closest proximity to the receiving coil array 216, the signal $Si_2$ would have the value of '1'; if the target feature 104-2 is directly underneath or in closest proximity to the receiving coil array 216, the signal $Si_2$ would have the value of '2'; if the target feature 104-3 is directly underneath or in closest proximity to the receiving coil array 216, the signal $Si_2$ would have the value of '3'; if the target feature 104-4 is directly underneath or in closest proximity to the receiving coil array 216, the signal $Si_2$ would have the value of '4'; if the target feature 104-5 is directly underneath or in closest proximity to the receiving coil array 216, the signal $Si_2$ would have the value of '5'; and if the target feature 104-6 is directly underneath or in closest proximity to the receiving coil array 216, the signal $Si_2$ would have the value of '6'.

In some implementations, the signal $Si_2$ may be generated by rounding off the ratio of the signal $S_d$ and the period of the array 120 of conductive features. In some implementations, the signal $Si_1$ may be calculated based on Equation 3 below:

$$Si_2 = \left\lfloor \frac{S_d}{\frac{360}{N+I}} \right\rfloor \tag{6}$$

where N+I is the number of conductive features 104 in the array 120 and (360/(N+I)) is the period of the array 120. In the present example, the period of the array 120 is represented as the inverse of the density of conductive features 104 per unit of signal $S_d$.

At step 914, the correction unit 854 calculates an offset index signal $So_2$. In some implementations, the signal $Si_2$ may be generated by offsetting and rounding off the ratio of the signal $S_d$ and the period of the array 120 of conductive features. In some implementations, the signal $So_2$ may be calculated based on Equations 7 and 8 below:

$$So_2 = \left\lfloor \frac{S_d}{\frac{360}{(N+I)}} + K \right\rfloor \tag{7}$$

$$K = \frac{1}{2} \tag{8}$$

where K is an offset constant. According to the present example, K is equal to 0.5. However, alternative implementations are possible in which K is another positive value that is greater than 0 and less than 1. As can be readily appreciated, the signal $So_1$ is an alternative index signal. The signal $So_2$ would be equal to the signal $Si_2$ in circumstances when a given one of the conductive features 104 is distinctly most proximate to the receiving coil array 216 (i.e., when the given conductive feature 104 is directly under receiving coil array 216). The signal $So_2$ would be greater (by 1) than the signal $Si_2$ when the two different conductive features are at roughly the same distance from the receiving coil array 216, but due to noise and other uncertainties in the processing pipeline, it is unclear which one is the closest. In other words, under many (or ideally all) circumstances, one of the signals $So_2$ and $Si_2$ is always guaranteed to identify correctly the index of the target feature 104 that is in closest proximity to the receiving coil array 216.

At step 916, the current value of a selector function $SEL_1$ is calculated. The selector function $SEL_1$ is a square wave function. The value of the selector function $SEL_1$ may be either logic-high (i.e., TRUE) or logic-low (i.e., FALSE). The value of the selector function $SEL_1$ at any given time may be based on the value of the remainder that is discarded as a result of evaluating the floor function (or another rounding function) when the values of signals $Si_1$ and $So_1$ are calculated at the given time. In some implementations, the selector function $SEL_1$ may be represented by Equation 9 below:

$$SEL_1 = rem\left( \frac{S_d}{\frac{360}{N}} - 0.25 \right) < 0.5 \tag{9}$$

where rem is the remainder function. Equation 9 provides that when the remainder that is discounted by the floor function of Equation 4 is less than 0.75, the selector function $SEL_1$ is set to logic-high. Otherwise, the selector function is set to logic-low. In other words, in circumstances in which Equation 4 is likely to underestimate the correct value for the signal $Si_1$ (as gleaned from the sheer size of the remainder that was discarded), the selector function $SEL_1$ would be set to logic-high.

At step 918, the current value of a selector function $SEL_2$ is calculated. The selector function $SEL_2$ is a square wave function. The value of the selector function $SEL_2$ may be either logic-high (i.e., TRUE) or logic-low (i.e., FALSE). The value of the selector function at any given time may be based on the value of the remainder that is discarded as a result of evaluating the floor function (or another rounding function) when the values of signals $Si_2$ and $So_2$ are calculated at the given time. In some implementations, the selector function $SEL_2$ may be represented by Equation 10 below:

$$SEL_2 = rem\left(\frac{S_d}{\frac{360}{N+1}} - 0.25\right) < 0.5 \tag{10}$$

where rem is the remainder function. Equation 10 provides that when the remainder that is discounted by the floor function of Equation 7 is less than 0.75, the selector function $SEL_2$ is set to logic-high. Otherwise, the selector function is set to logic-low. In other words, in circumstances in which Equation 7 is likely to underestimate the correct value for the signal $Si_1$ (as gleaned from the sheer size of the remainder that was discarded), the selector function $SEL_2$ would be set to logic-high.

At step 920, the correction unit 854 selects one of the value of the signal $Si_1$ and the value of the signal $So_1$. Specifically, if the value of the selector function $SEL_1$ is logic-high, the value of the signal $Si_1$ is selected. Otherwise, if the value of the selector function $SEL_1$ is logic-low, the value of the signal $So_1$ is selected. In other words, step 920 effectively selects one of the conductive feature indices that are represented by the signals $Si_1$ and $So_1$.

At step 922, the correction unit 854 selects one of the value of the signal $Si_2$ and the value of the signal $So_2$. Specifically, if the value of the selector function $SEL_2$ is logic-high, the value of the signal $Si_2$ is selected. Otherwise, if the value of the selector function $SEL_2$ is logic-low, the value of the signal $So_2$ is selected. In other words, step 922 effectively selects one of the conductive feature indices that are represented by the signals $Si_2$ and $So_2$.

At step 924, the correction unit 854 calculates an unwrapped electrical angle $Ua_1$ based on the selected one of the signals $Si_1$ and $So_1$ (at step 920). If, at step 920, the signal $Si_1$ is selected, the value of the unwrapped electrical angle $Ua_1$ is calculated based on Equation 11 below. If, at step 920, the signal $So_1$ is selected, the value of the unwrapped electrical angle $Ua_1$ is calculated based on Equation 12 below.

$$Ua_1 = ((Si_1 * 360) - 180) + ((S_1 + 180)\%360) \tag{11}$$

$$Ua_1 = (So_1 * 360) + (S_1 \% 360) \tag{12}$$

According to the present disclosure, an unwrapped signal $S_1$ may be any signal that is generated, at least in part, by multiplying the index value (selected at step 920) by the constant of '360', and adding the signal $S_1$ modulo 360 to the resulting product.

At step 926, the correction unit 854 calculates an unwrapped electrical angle $Ua_2$ based on the selected one of the signals $Si_2$ and $So_2$ (at step 922). If, at step 922, the signal $Si_2$ is selected, the value of the unwrapped electrical angle $Ua_2$ is calculated based on Equation 13 below. If, at step 922, the signal $So_2$ is selected, the value of the unwrapped electrical angle $Ua_2$ is calculated based on Equation 14 below.

$$Ua_2 = ((Si_2 * 360) - 180) + ((S_2 + 180)\%360) \tag{13}$$

$$Ua_2 = (So_2 * 360) + (S_2 \% 360) \tag{14}$$

At step 928, the correction unit 854 calculates the output signal $S_{out}$ based on the difference between the values of $Ua_1$ and $Ua_2$. In some implementations, the signal $S_{out}$ may be calculated based on Equation 15 below:

$$S_{out} = Ua_2 - Ua_1 \tag{15}$$

Figure 10A:
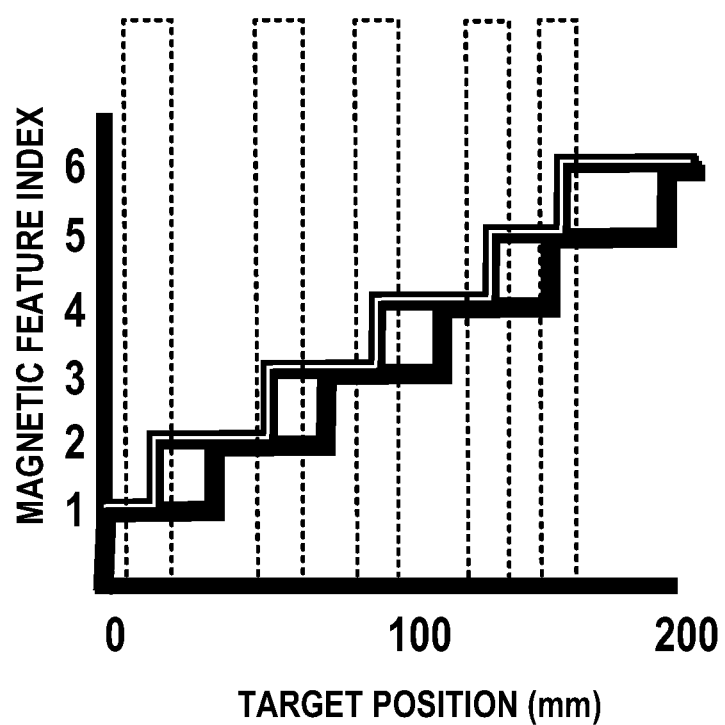
FIG. 10A is a plot showing an example of an index signal and an offset index signal, according to aspects of the disclosure.
Figure 10A:
Figure 10A:
Figure 10A:

FIG. 10A is a plot of the signals $Si_1$ and $So_1$, and the selector function $SEL_1$. The Y-axis of the plot is conductive feature index. The X-axis of the plot is position of the target strip 100 relative to the sensor 210. FIG. 10A illustrates that the signals $So_1$ and $Si_1$ have a stepped waveform and the selector function $SEL_1$ has a square waveform. FIG. 10A shows the relationship between the current position of the target strip 100 and the values, which the signals $Si_1$ and $So_1$ would have at the same time.

Figure 10B:
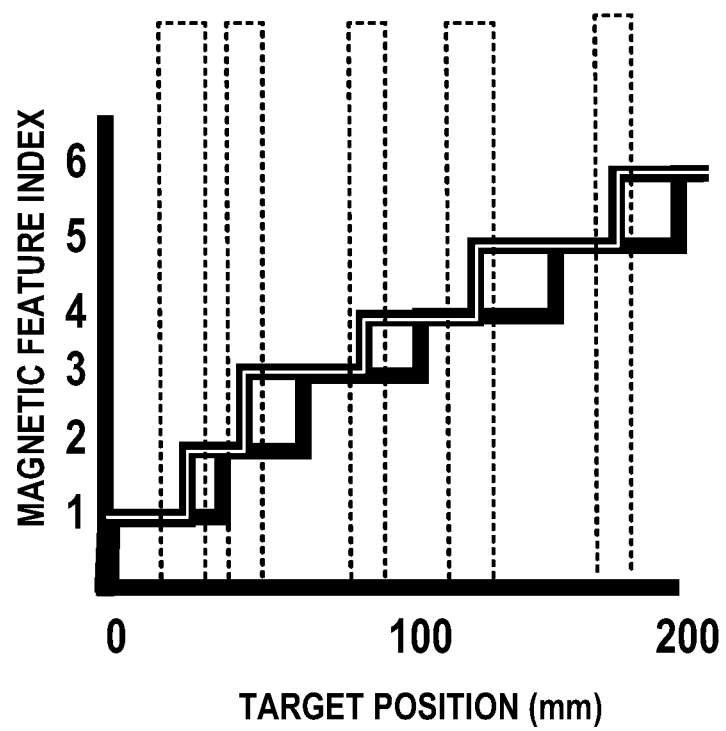
FIG. 10B is a plot showing an example of an index signal and an offset index signal, according to aspects of the disclosure.
Figure 10C:
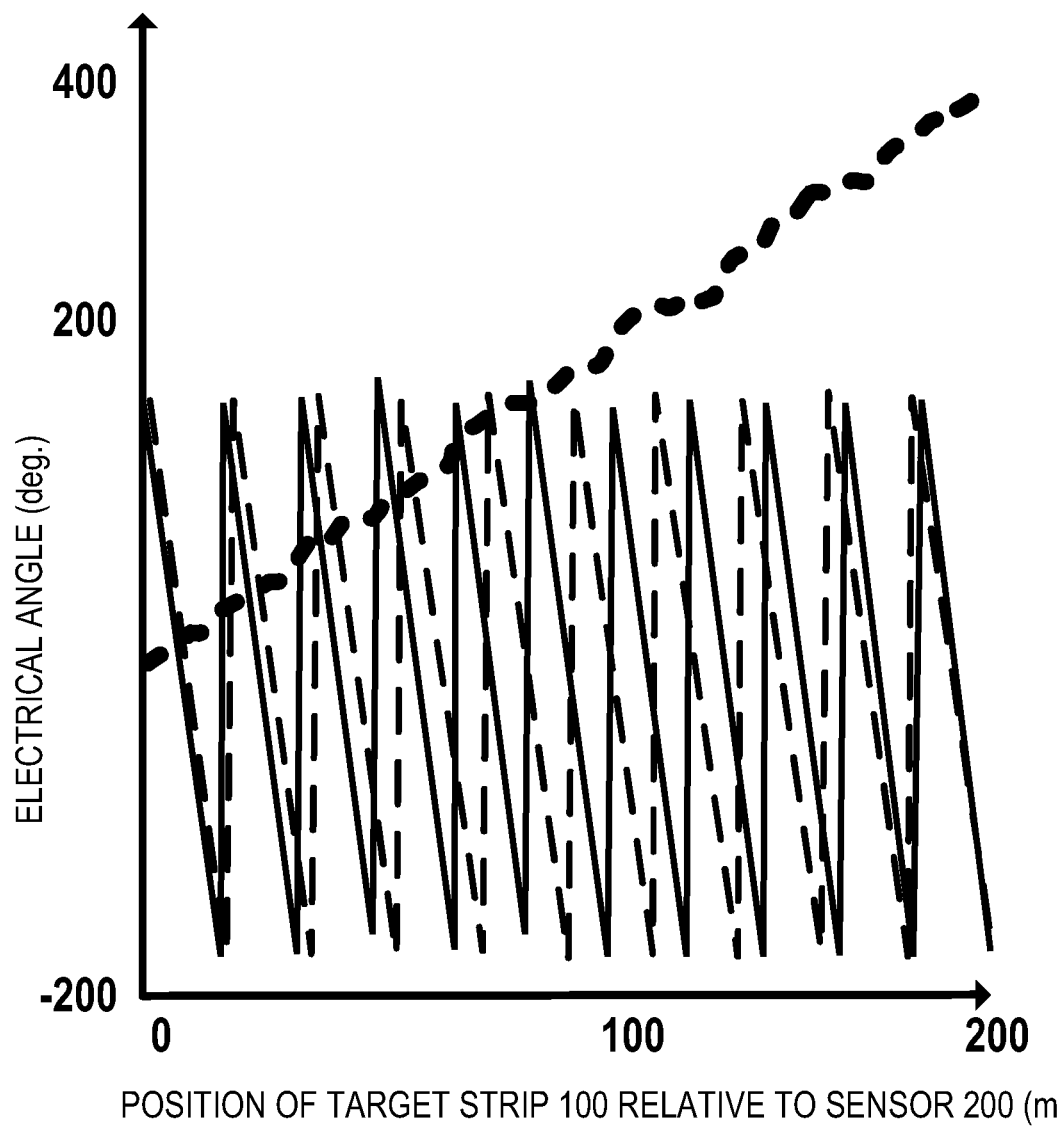
FIG. 10C is a plot showing an example of signals that are generated in a position sensor, according to aspects of the disclosure.

FIG. 10B is a plot of the signals $Si_2$ and $So_2$, and the selector function $SEL_2$. The Y-axis of the plot is conductive feature index. The X-axis of the plot is position of the target strip 100 relative to the sensor 210. FIG. 10B illustrates that the signals $So_2$ and $Si_2$ have a step waveform and the selector function $SEL_2$ has a square waveform. FIG. 10B shows the relationship between the current position of the target strip 100 and the values, which the signals $Si_2$ and $So_2$ would have at the same time.

FIG. 10C is a plot of the signals $S_1$ and $S_2$, and the signal $S_d$. The Y-axis of the plot is electrical angle (or signal value). The X-axis of the plot is position of the target strip 100 relative to the sensor 210. FIG. 10C shows the relationship between the current position of the target strip 100 and the values, which the signals $S_1$, $S_2$, and $S_d$ would have at the same time.

Figure 11:
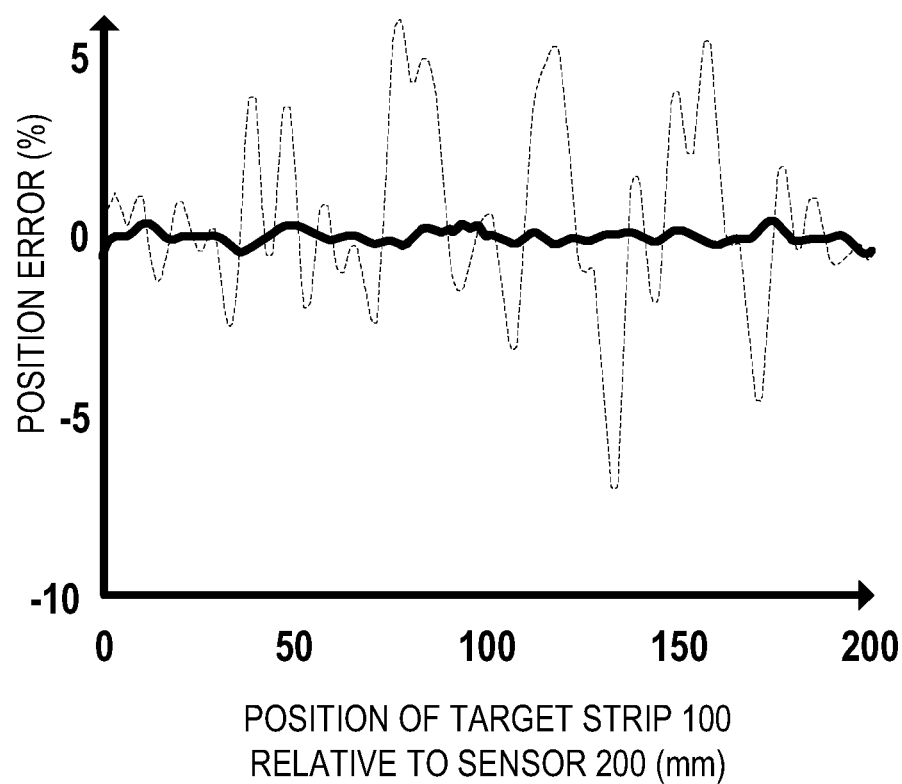
FIG. 11 is a plot showing the error of different position signals, according to aspects of the disclosure.

FIG. 11 is a plot of the error in the signals $S_d$ and $S_{out}$, and the signal $S_d$. The Y-axis of the plot is position error. The X-axis of the plot is position of the target strip 100 relative to the sensor 210. FIG. 11 shows the relationship between the current position of the target strip 100, as it is identified by each of the signals $S_d$ and $S_{out}$, and the error that is present in each of the signals $S_{out}$ and $S_d$ at the same time.

In one aspect, FIG. 11 illustrates some of the advantages of the sensor 210 over some conventional position sensors. Some conventional position sensors would use the signal $S_d$ as their output signal. They may use a signal that is calculated in the same manner as the signal Sd as their output signal (or an angular/linear position that is directly derived from the signal) and may lack the processing step associated with the process 900. FIG. 11 illustrates that the addition of the processing step (performed by process 900) to the list of operations that are performed by the processing circuitry 310 can greatly improve the accuracy of the sensor 210.

Figure 12:
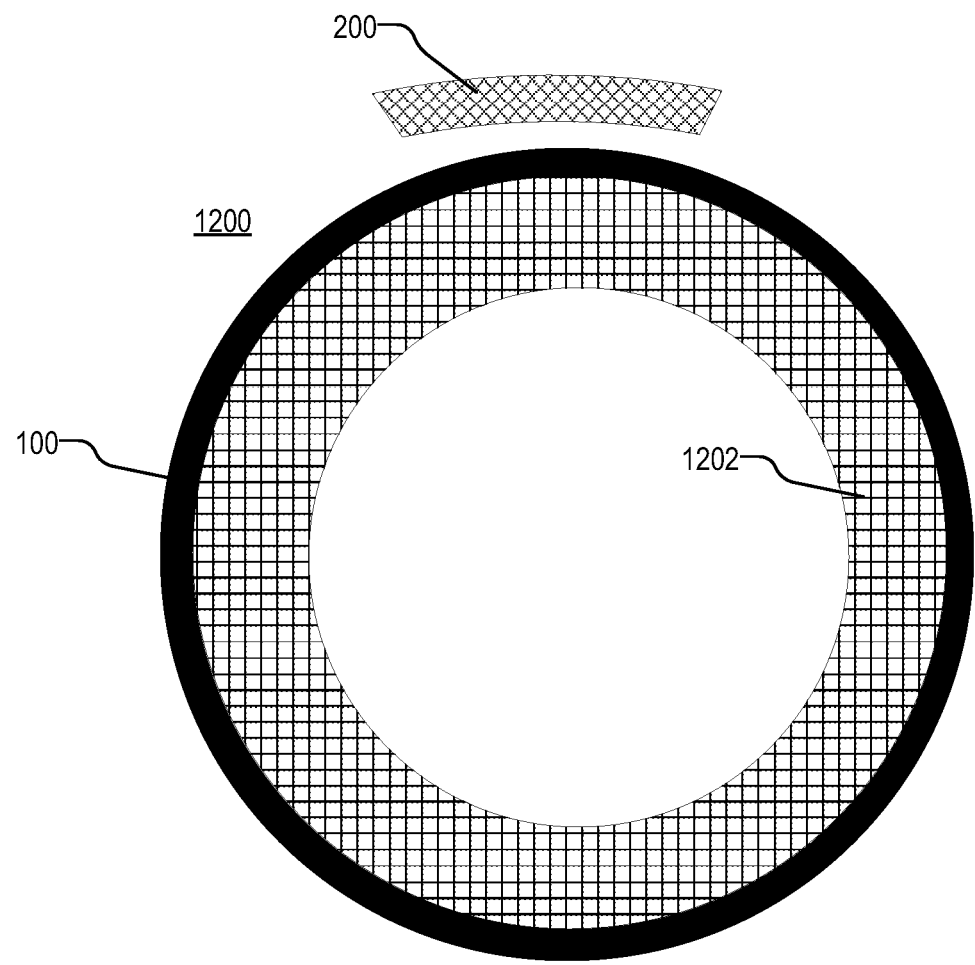
FIG. 12 is a diagram of an example of a system, according to aspects of the disclosure.

FIG. 12 is a diagram of a system 1200, according to aspects of the disclosure. In the example of FIG. 12, the target strip 100 is formed on a flexible substrate, which is adhered around the circumference of a wheel 1202. The substrate 214 of the sensor 210 is imparted a curved shape (or C-shape) and arranged to face the circumference of the wheel 1202. In some respects, FIG. 12 is provided to illustrate that the concepts and ideas presented throughout the disclosure can be used with the same success to measure angular displacement, as they can be used to measure linear displacement.

Figure 13A:
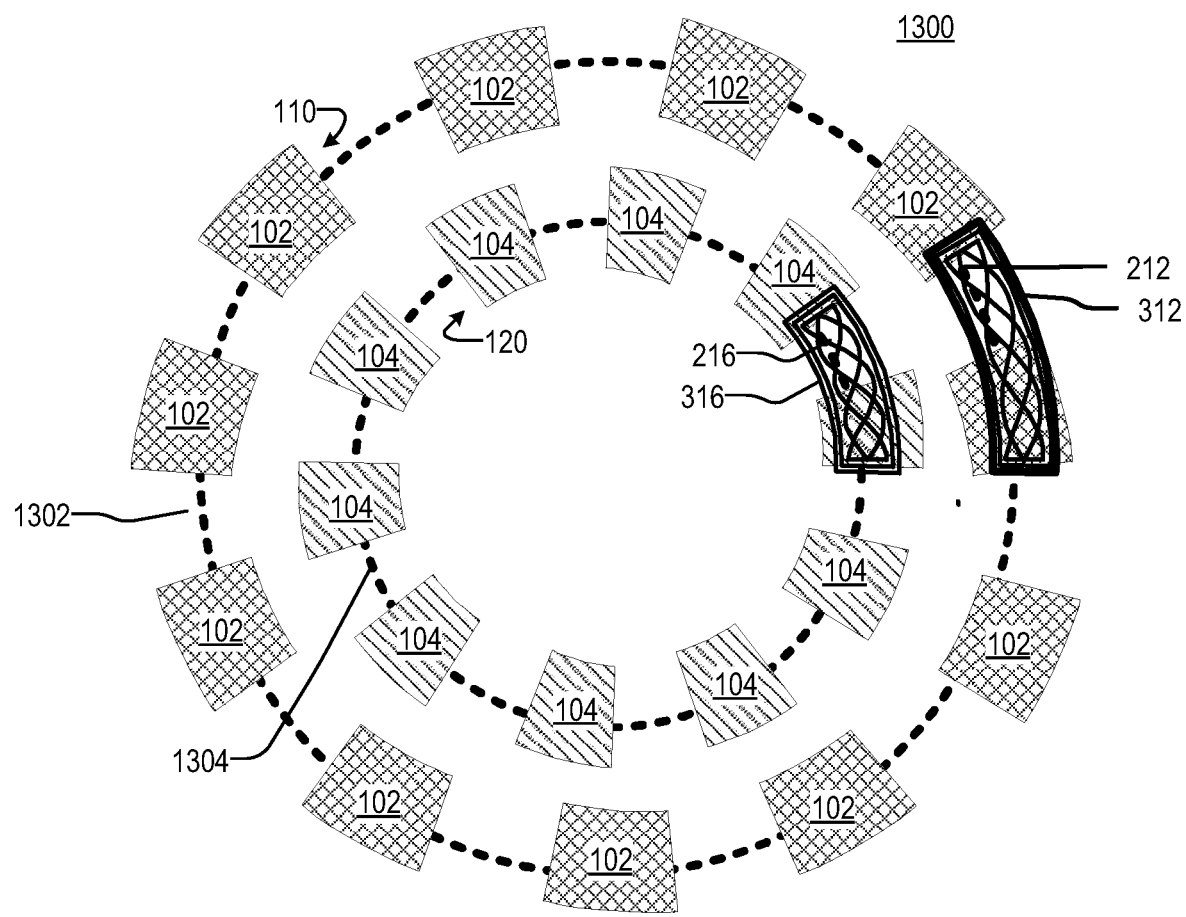
FIG. 13A is a diagram of an example of a system, according to aspects of the disclosure.
Figure 13B:
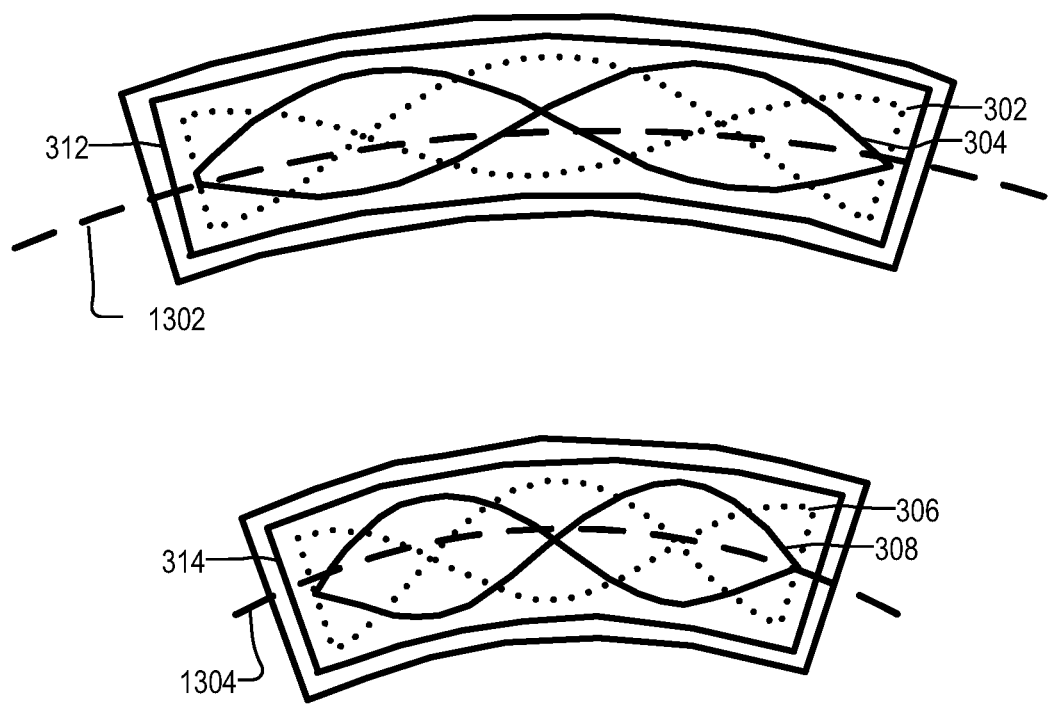
FIG. 13B is a diagram of an example of transmitting coils and receiving coil arrays that are part of the system of FIG. 13A, according to aspects of the disclosure.

FIG. 13A is a diagram of an example of a system 1300, according to aspects of the disclosure. In the example of FIG. 13A, the target 100 is configured as a patch, rather than a strip. Specifically, the target features 102 of the array 110 are arranged in a circle 1302 and the target features 104 of the array 120 are arranged in a circle 1304. According to the present example, the circle 1304 is centered with the circle 1302. Although, in the present example, the features 102 and 104 are arranged in a circle, alternative implementations are possible in which the target features in any of the arrays 110 and 120 are arranged in any type of loop (e.g., oval, etc.). In the example of FIG. 13A, the receiving coil array 212 is bent in an arch that has the same radius as the circle 1302, and the receiving coil array 216, the receiving coil array is bent in an arch that has the same radius as the circle 1304. Furthermore, in the example of FIG. 13A, the transmitting coil 312 is shaped like the segment of a ring and the transmitting coil 316 is also shaped like the segment of a ring. FIG. 13B illustrates the receiving coil arrays 212 and 216 and the transmitting coils 312 and 316 in closer detail. FIG. 13B illustrates that the point of inflection of each sinusoidal (or co-sinusoidal) segment of the receiving coils in the arrays 212 and 216 may coincide with a respective point in one of the circles 1302 and 1304. Although not shown in FIG. 13A, the features 102 and 104 may be mounted on a substrate (e.g., a flexible or rig substrate) or integrated into a PCB. Although not shown, the features 102 and 104 may be coupled with one another via a circular spine. FIG. 13A is provided as an example only, and the present disclosure is not limited to the specific implementation of the target 100, which is shown in FIG. 13A. In operation, the implementation of the target 100, which is shown in FIG. 13A, may be mounted on the side of a wheel, a gear, and/or any other moving element.

The concepts and ideas described herein may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, or volatile memory. The term unit (e.g., an addition unit, a multiplication unit, etc.), as used throughout the disclosure may refer to hardware (e.g., an electronic circuit) that is configured to perform a function (e.g., addition or multiplication, etc.), software that is executed by at least one processor, and configured to perform the function, or a combination of hardware and software.

As is known, some of the above-described electromagnetic flux sensing elements tend to have an axis of maximum sensitivity parallel to a substrate that supports the electromagnetic flux sensing element, and others of the above-described electromagnetic flux sensing elements tend to have an axis of maximum sensitivity perpendicular to a substrate that supports the electromagnetic flux sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A system, comprising:
a target including: (i) a first array of conductive features that are arranged in a line or arc and separated from one another by voids, (ii) a second array of conductive features that are arranged in a line or arc and separated from one another by voids, the conductive features in the first array being staggered with respect to the conductive features in the second array, and (iii) a spine, wherein the target has a flat shape, the first array of conductive features and the second array of conductive features are coupled to the spine, the conductive features in the first array extend from the spine in first direction, and the conductive features in the second array extend from the spine in a second direction that is opposite to the first direction;
a first receiving coil array configured to sense a first magnetic field that is associated with the first array of conductive features; and
a second receiving coil array configured to sense a second magnetic field that is associated with the second array of conductive features.

2. The system of claim 1, further comprising a processing circuitry configured to:
generate a signal $S_d$ that is indicative of a position of the target, the signal Sa being generated based on a signal $S_1$ and a signal $S_2$, the signal $S_1$ being generated with the first receiving coil array in response to the first magnetic field and the signal $S_2$ being generated with the second receiving coil array in response to the second magnetic field;
generate a first index signal based on the signal $S_d$ and generate an electrical angle signal $Ua_1$ based on the signal $S_1$ and the first index signal;
generate a second index signal based on the signal $S_d$ and calculate an electrical angle signal $Ua_2$ based on the electrical angle signal $S_2$ and the second index signal; and
generate an output signal $S_{out}$ based on the electrical angle signals $Ua_1$ and $Ua_2$, the output signal $S_{out}$ being indicative of the position of the target, wherein the first index signal identifies one of the conductive features in the first array of conductive features that is adjacent to the first receiving coil array, and wherein the second index signal identifies one of the conductive features in the second array of conductive features that is adjacent to the second receiving coil array.

3. The system of claim 1, wherein any of the conductive features in the first array is aligned with at least one of: (i) a respective conductive feature in the second array, and/or (ii) a respective void that separates conductive features in the second array.

4. The system of claim 1, wherein each of the first array and the second array extends from a first end region of the target to a second end region of the target, the first array includes a different number of conductive features than the second array.

5. The system of claim 1, wherein the first receiving coil and the second are spaced apart from the spine by at least 4 mm.

6. The system of claim 1, wherein the first array includes at least N conductive features and the second array includes at least N+I conductive features, where I is a positive integer greater than or equal to 1, and N is a positive integer greater than or equal to 1.

7. The system of claim 1, further comprising a first transmitting coil, wherein:
the first receiving coil array is disposed inside the first transmitting coil,
the first transmitting coil is so dimensioned as to create: (i) a first buffer space on a first side of the first receiving coil array and (ii) a second buffer space on a second side of the first receiving coil array, the second buffer space being opposite the first buffer space, and
a first width of the first buffer space is equal to at least half a length of any of the conductive features in the first array of conductive features, and a second width of the second buffer space is equal to at least half a length of any of the conductive features in the first array of conductive features.

8. A target, comprising:
a spine;
a first array of conductive features that are coupled to the spine and separated from one another by voids, the first array including N conductive features, where N is a positive integer greater than 1; and
a second array of conductive features that are coupled to the spine and are separated from one another by voids, the second array including N+I conductive features, where I is a positive integer greater than or equal to 1,
wherein any of the conductive features in the first array is aligned with at least one of: (i) a respective conductive feature in the second array, and/or (ii) a respective void that separates conductive features in the second array, and
wherein the spine has a flat shape, the conductive features in the first array extend in a first direction, and the conductive features in the second array extend in a second direction that is opposite to the first direction.

9. The target of claim 8, wherein the conductive features in the first array are spaced apart by voids having a first width and the conductive features in the second array are spaced by voids having a second width that is different from the first width.

10. The target of claim 8, wherein the conductive features in the first array have a first width and the conductive features in the second array have a second width that is different from the first width.

11. The target of claim 8, wherein each conductive feature in the first array is aligned with both a respective conductive feature in the second array and a respective void that separates the respective conductive feature in the second array from a neighboring conductive feature in the second array.

12. The target of claim 8, wherein the conductive features in the second array are staggered with respect to the conductive features in the first array.

13. The target of claim 10, wherein the first array and the second array are part of a printed circuit board (PCB).

14. The target of claim 8, wherein the first array and the second array are formed on a flexible substrate.

15. The target of claim 8, wherein the first array and the second array are formed on a substrate.

16. The target of claim 8, wherein the first array and the second array are formed on a surface of a substrate that is curved.

17. The target of claim 8, wherein each of the first array and the second array extends from a first end region of the target to a second end region of the target, the first array includes a different number of conductive features than the second array.

18. The target of claim 8, wherein the conductive features in the first array are arranged in a first line, and the conductive features of the second array are arranged in a second line.

19. The target of claim 8, wherein the conductive features in the first array are arranged in a loop and the conductive features in the second array are arranged in a loop.

20. A system, comprising:
a target including: (i) first array of conductive features that are arranged in a line and separated from one another by voids, the first array including N conductive features, where N is a positive integer greater than 1, (ii) a second array of conductive features that are arranged in a line and separated from one another by voids, the second array including N+I conductive features, where I is a positive integer greater than or equal to 1, and (iii) a spine, wherein the target has a flat shape, the first array of conductive features and the second array of conductive features are coupled to the spine, the conductive features in the first array extend from the spine in a first direction, and the conductive features in the second array extend from the spine in a second direction that is opposite to the first direction;
a first receiving coil array configured to sense a first magnetic field that is associated with the first array of conductive features; and
a second receiving coil array configured to sense a second magnetic field that is associated with the second array of conductive features.

21. The system of claim 20, further comprising a first transmitting coil and a second transmitting coil, wherein the first magnetic field is generated in response to a magnetic field that is produced by the first transmitting coil, and the second magnetic field is generated in response to a magnetic field that is produced by the second transmitting coil.

22. The system of claim 20, wherein the first receiving coil array includes a first receiving coil having a sinusoidal shape, and a second receiving coil having a co-sinusoidal shape.

23. The system of claim 20, wherein:
any of the of the conductive features in the first array of conductive features has a width W1,
any of the voids in the first array of conductive features has a width W2,
the first receiving coil array is disposed over the first array of conductive features, and
the first receiving coil array has a width that is substantially equal to the sum of W1 and W2.

24. The system of claim 20, wherein:
any of the of the conductive features in the first array of conductive features has a width W1,
any of the voids in the first array of conductive features has a width W2,
the first receiving coil array is disposed over the first array of conductive features, and
the first receiving coil array has a width that is substantially equal to an integer multiple of the sum of W1 and W2.

25. The system of claim 20, further comprising a first transmitting coil, wherein:
the first receiving coil array is disposed inside the first transmitting coil,
the first transmitting coil is so dimensioned as to create: (i) a first buffer space on a first side of the first receiving coil array and (ii) a second buffer space on a second side of the first receiving coil array, the second buffer space being opposite the first buffer space, and
a first width of the first buffer space is equal to at least half a length of any of the conductive features in the first array of conductive features, and a second width of the second buffer space is equal to at least half a length of any of the conductive features in the first array of conductive features.

26. The system of claim 20, wherein:
the first receiving coil array includes a first receiving coil and a second receiving coil,
the first receiving coil has a first sinusoidal loop and a second sinusoidal loop that is off-phase from the first sinusoidal loop, and
the second receiving coil has a first co-sinusoidal loop and a second co-sinusoidal loop that is off-phase from the first co-sinusoidal loop.

27. The system of claim 20, further comprising:
a third receiving coil array that is configured to sense the first magnetic field; and
a fourth receiving coil array that is configured to sense the second magnetic field,
wherein any of the conductive features in the first array of conductive features has a length that is greater than or equal to a sum of lengths of the first receiving coil array and the third receiving coil array, and
wherein any of the conductive features in the second array of conductive features has a length that is greater than or equal to a sum of lengths of the second receiving coil array and the fourth receiving coil array.

28. The system of claim 20, further comprising:
a third receiving coil array that is configured to sense the first magnetic field; and
a fourth receiving coil array that is configured to sense the second magnetic field,
wherein the first receiving coil array and the third receiving coil array have opposite polarities, and
wherein the second receiving coil array and the fourth receiving coil array have opposite polarities.

29. The system of claim 20, wherein the conductive features in the first array of conductive features are spaced apart by voids having a first width and the conductive features in the second array of conductive features are spaced by voids having a second width that is different from the first width.

30. The system of claim 20, wherein the conductive features in the first array of conductive features have a first width and the conductive features in the second array of conductive features have a second width that is different from the first width.

31. The system of claim 20, wherein the first receiving coil and the second receiving coil are spaced apart from the spine by at least 4 mm.

32. The system of claim 20, wherein:
the first receiving coil array is offset from the spine by a first predetermined distance, and
the second receiving coil array is offset from the spine by a second predetermined distance.

33. The system of claim 20, wherein any of the conductive features in the first array is aligned with at least one of: (i) a respective conductive feature in the second array, and/or (ii) a respective void that separates conductive features in the second array.

34. The system of claim 20, wherein the target is configured to perform a reciprocal motion relative to the first receiving coil array in which: (i) first and last conductive features of the first array of conductive features do not travel past the first receiving coil array, and (i) first and last conductive features of the second array of conductive features do not travel past the second receiving coil array.

35. A system, comprising:
a processing circuitry configured to:
generate a signal $S_d$ that is indicative of a position of a target that includes a first array of conductive features and a second array of conductive features, the signal $S_d$ being generated based on a signal $S_1$ and a signal $S_2$, the signal $S_1$ being generated in response to a first magnetic field that is associated with the first array of conductive features, and the signal $S_2$ being generated in response to a second magnetic field that is associated with the second array of conductive features;
generate a first index signal based on the signal $S_d$ and generate an electrical angle signal $Ua_1$ based on the signal $S_1$ and the first index signal;
generate a second index signal based on the signal $S_d$ and generate an electrical angle signal $Ua_2$ based on the signal $S_2$ and second index signal; and
generate an output signal $S_{out}$ based on the electrical angle signals $Ua_1$ and $Ua_2$, the output signal $S_{out}$ being indicative of a position of the target.

36. The system of claim 35, wherein:
the first index signal identifies one of the conductive features in the first array of conductive features that is adjacent to a first receiving coil array, and
the second index signal identifies one of the conductive features in the second array of conductive features that is adjacent to a second receiving coil array.

37. The system of claim 35, wherein the electrical angle signal $Ua_1$ is generated in accordance with the equation of $Ua_1=((Si_1*360)-K)+ ((S_1+K) \%360)$, where $Si_1$ is the first index signal, and K is a constant.

38. The system of claim 36, wherein the first index signal is an offset index signal, and the electrical angle signal $Ua_1$ is generated in accordance with the equation of $Ua_1=(So_1*360)+(S_1\%360)$, where $So_1$ is the first index signal.

* * * * *